US009424191B2

(12) United States Patent
Cherukuri et al.

(10) Patent No.: US 9,424,191 B2
(45) Date of Patent: Aug. 23, 2016

(54) SCALABLE COHERENCE FOR MULTI-CORE PROCESSORS

(75) Inventors: Naveen Cherukuri, San Jose, CA (US); Mani Azimi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 13/539,044

(22) Filed: Jun. 29, 2012

(65) Prior Publication Data

US 2014/0006714 A1 Jan. 2, 2014

(51) Int. Cl.
G06F 12/0831 (2016.01)
G06F 12/08 (2016.01)

(52) U.S. Cl.
CPC ........ G06F 12/0817 (2013.01); G06F 12/0815 (2013.01); Y02B 60/1225 (2013.01)

(58) Field of Classification Search
None
See application file for complete search history.

(56) References Cited

U.S. PATENT DOCUMENTS

| 5,014,195 | A | * | 5/1991 | Farrell et al. ................. 711/128 |
| 5,752,069 | A | * | 5/1998 | Roberts et al. ................ 712/23 |
| 6,622,218 | B2 | * | 9/2003 | Gharachorloo et al. ...... 711/141 |
| 7,240,160 | B1 | * | 7/2007 | Hetherington et al. ....... 711/122 |
| 2003/0093624 | A1 | * | 5/2003 | Arimilli et al. .............. 711/141 |
| 2003/0233388 | A1 | | 12/2003 | Glasco et al. |
| 2004/0230750 | A1 | * | 11/2004 | Blake et al. ................... 711/146 |
| 2005/0010728 | A1 | * | 1/2005 | Piry et al. ...................... 711/147 |
| 2005/0188009 | A1 | * | 8/2005 | McKinney et al. ........... 709/203 |
| 2009/0006808 | A1 | * | 1/2009 | Blumrich et al. ............. 712/12 |
| 2009/0037658 | A1 | * | 2/2009 | Sistla ............................. 711/119 |
| 2011/0055515 | A1 | * | 3/2011 | Khubaib et al. .............. 711/207 |
| 2011/0185125 | A1 | * | 7/2011 | Jain et al. ...................... 711/122 |
| 2011/0296116 | A1 | * | 12/2011 | Sistla ............................. 711/146 |

FOREIGN PATENT DOCUMENTS

WO 2014/004008 A1 1/2014

OTHER PUBLICATIONS

International Search Report and Written Opinion received for PCT Patent Application No. PCT/US2013/044352, mailed on Sep. 25, 2013, 10 pages.
International Preliminary Report on Patentability and Written Opinion received for PCT Patent Application No. PCT/US2013/044352, mailed on Jan. 8, 2015, 7 pages.

* cited by examiner

Primary Examiner — Yaima Rigol
Assistant Examiner — Tasnima Matin
(74) Attorney, Agent, or Firm — Vecchia Patent Agent, LLC

(57) ABSTRACT

An apparatus of an aspect includes a plurality of cores. The plurality of cores are logically grouped into a plurality of clusters. A cluster sharing map-based coherence directory is coupled with the plurality of cores and is to track sharing of data among the plurality of cores. The cluster sharing map-based coherence directory includes a tag array to store corresponding pairs of addresses and cluster identifiers. Each of the addresses is to identify data. Each of the cluster identifiers is to identify one of the clusters. The cluster sharing map-based coherence directory also includes a cluster sharing map array to store cluster sharing maps. Each of the cluster sharing maps corresponds to one of the pairs of addresses and cluster identifiers. Each of the cluster sharing maps is to indicate intra-cluster sharing of data identified by the corresponding address within a cluster identified by the corresponding cluster identifier.

27 Claims, 17 Drawing Sheets

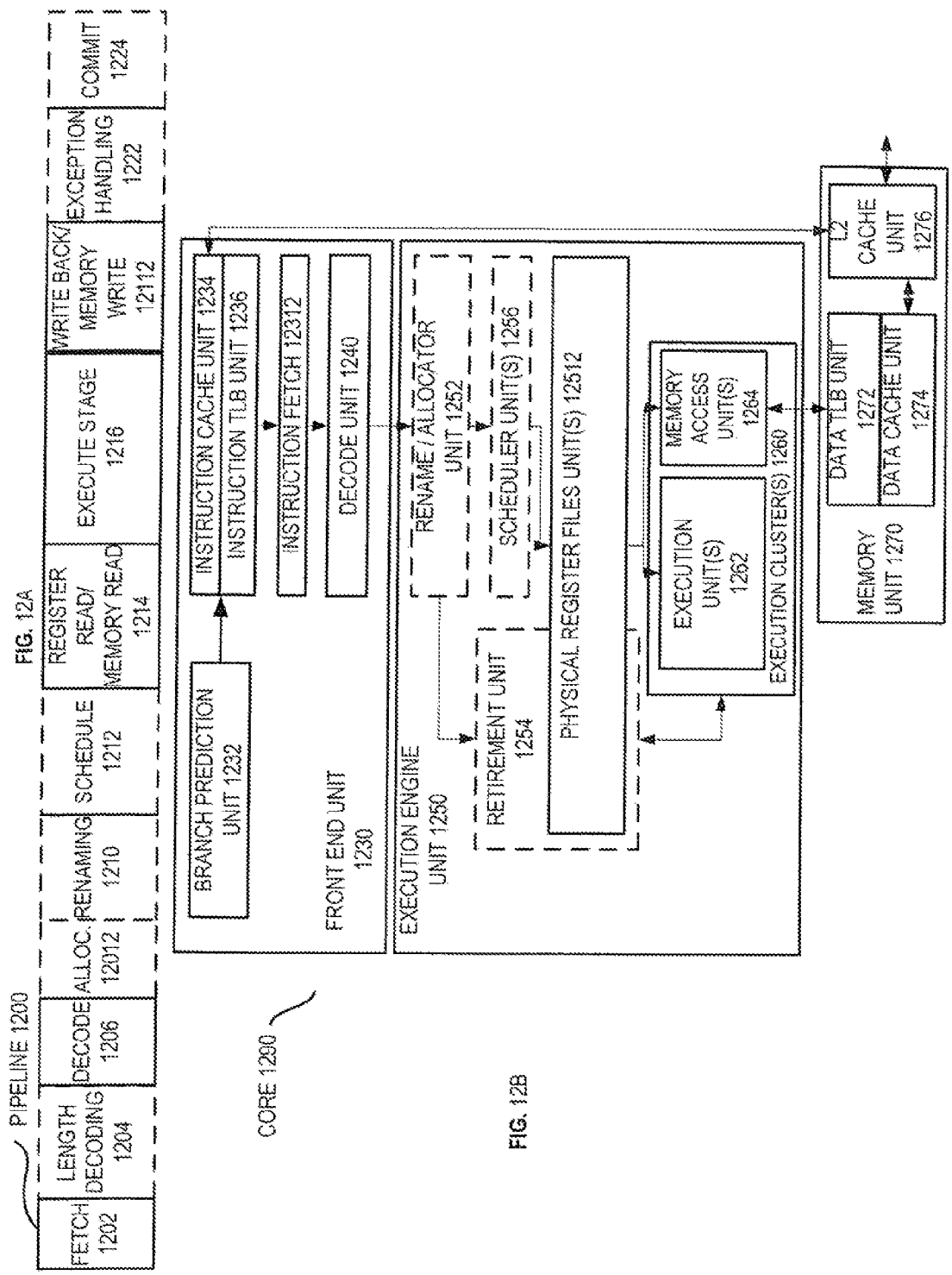

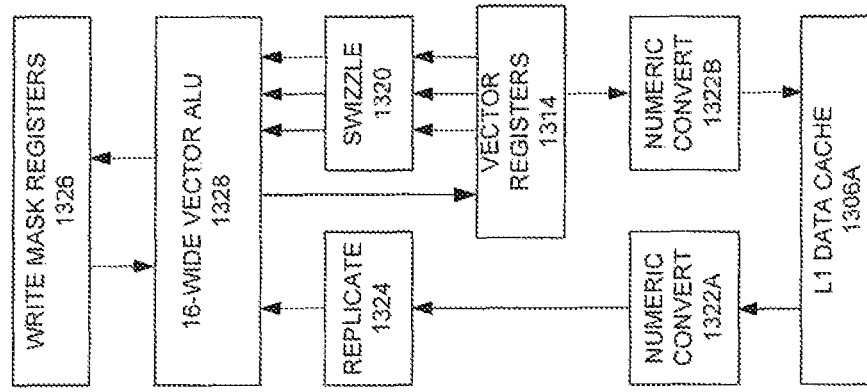
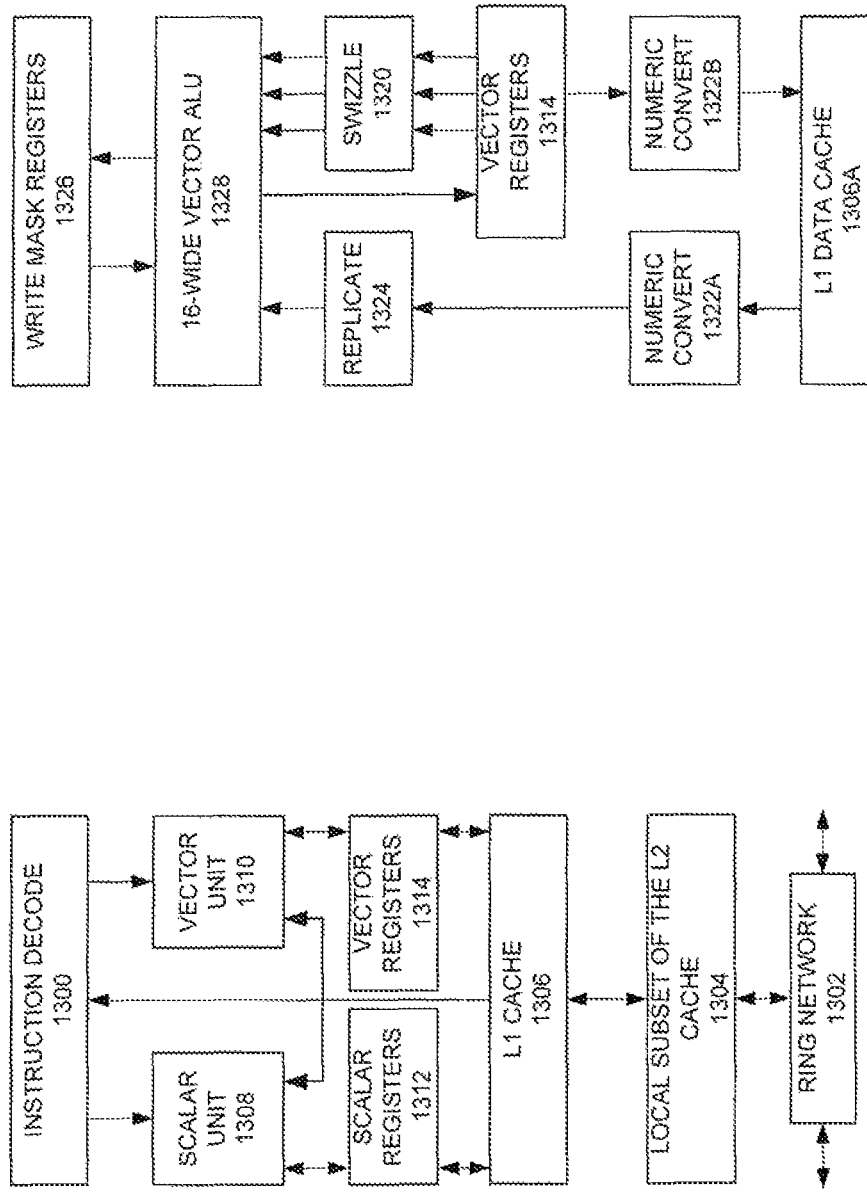

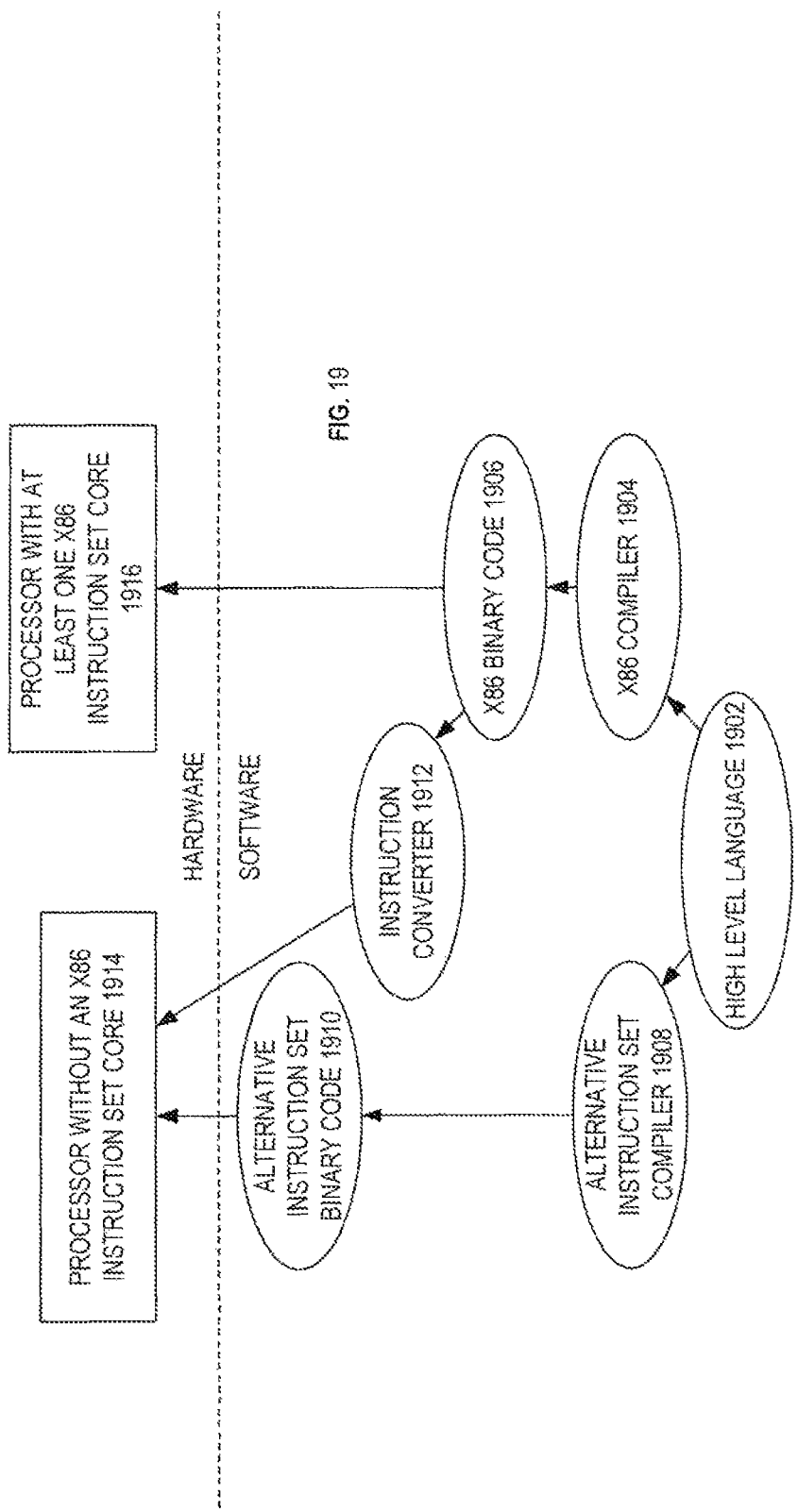

SCALABLE COHERENCE FOR MULTI-CORE PROCESSORS

BACKGROUND

1. Field

Embodiments relate to multi-core processors. In particular, embodiments relate to maintaining data coherence in multi-core processors.

2. Background Information

Chip multi-processors (CMPs), multi-core devices, and other multi-processor apparatus have a number of cores or processors on a single integrated circuit die or chip. Each core generally has associated therewith one or more corresponding local caches which are operable to cache copies of data from one or more shared memories. The cores are generally coupled together and are operable to share the data stored in their local caches with one another.

It is generally important to maintain coherence, or a consistent view of the data, across all of the cores. All-core sharing map-based hardware coherence directories are one of the commonly used hardware-based coherence mechanisms in present day general-purpose processors to help maintain coherence of data across all of the cores. These directories represent hardware structures that are operable to track data cached in the local cache(s) of all of the cores, as well as which of the cores are sharing the data. All-core hardware coherence tags are typically stored in the entries of the directories and indicate the sharing of the data.

FIG. 1 is a block diagram of a known all-core hardware coherence tag 100. As the name implies, the all-core hardware coherence tag has a scope of all of the cores and is operable to indicate sharing of data among any or all of the cores. The all-core hardware coherence tag includes an address field 102, a state field 104, and an all-core sharing map field 106. The address field may indicate an address (e.g., of a cache line caching a copy of data from memory and/or the memory address of the data). By way of example, the address field may have a length of 33-bits. The state field may indicate a state of the corresponding data or entry in the directory (e.g., whether the data or entry is modified, exclusive, shared or invalid). For example, the state field may have a length of 2-bits. The 2-bits may indicate any of four different states.

The all-core sharing map field 106 may indicate which of the cores of a device are caching a copy of the data corresponding to the address field as well. The all-core sharing map field generally includes 1-bit for each of the cores. As shown in the illustration, the all-core sharing map field has a length of 32-bits or 1-bit for each of 32-cores. The 1-bit corresponding to a given core is operable to indicate whether or not the given core is caching a copy of the data. According to one possible convention, a binary value of 1 (i.e., the bit being set) may be used to indicate that the given core is caching a copy of the data, whereas a binary value of 0 (i.e., the bit being cleared) may be used to indicate that the given core is not caching a copy of the data. For example, in the illustrated embodiment, bits [0:5] having the respective values 0 1 1 0 0 1 may indicate that, for the said address, core 0 is not caching, cores 1 and 2 are caching, cores 3 and 4 are not caching, and core 5 is caching.

FIG. 2 is a block diagram of a known all-core sharing map-based hardware coherence directory 210. The directory is set associative and includes a 4-way set associative tag array 212 and a 4-way set associative all-core sharing map array 214. There is a one-to-one correspondence between ways in the tag and cluster sharing map arrays. The tag array 212 is arranged as (k+1)-sets, labeled set[0] thorough set[k], and four ways, labeled way[0] through way[3]. The address and state fields are typically included in the tag array. As shown, set[1] includes address 102 and state 104 fields in each of way[1] and way[2]. The all-core sharing map array 214 is also arranged as (k+1)-sets, labeled set[0] thorough set[k], and four ways, labeled way[0] through way[3]. The all-core sharing map fields are typically included in the all-core sharing map array. As shown, set[1] includes all-core sharing map fields 106 in each of way[1] and way[2]. Typically, the number of tags in the directory equals the total number of tags in local/private caches of all cores to enable tracking distinct cache lines.

During operation, when it is desired to know which cores are caching data for a given address, the all-core sharing map-based hardware coherence directory may be consulted. The directory includes tag comparison logic 216. The tag comparison logic may compare four addresses, each stored within a different one of the four ways of a set, with a given address. The four addresses may be read out on tag array readout lines 218. Either none of the four addresses may match the given address, or at most a single address in a single way may match the given address. Assuming single address in a single way matches the given address, a way select signal 220, for example a 2-bit way select signal for a 4-way set associative array, may be output from the tag comparison logic to way selection logic 222. The way select signal may indicate the single way having the matching address. Four all-core sharing map fields, each in one of four different ways of the corresponding set, may be readout of all-core sharing map array readout lines 224 and provided to the way selection logic. The way selection logic may select the single all-core sharing map field on the single way indicated by the way select signal. For example, if the way select signal indicates way[2] (e.g., has a value of binary 10), then the all-core sharing map field in way[2] may be selected and output as a selected all-core sharing map 206. The output all-core sharing map field indicates which of the cores are sharing the data.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 12A is a block diagram illustrating both an exemplary in-order pipeline and an exemplary register renaming, out-of-order issue/execution pipeline according to embodiments of the invention FIG. 12B is a block diagram illustrating both an exemplary embodiment of an in-order architecture core and an exemplary register renaming, out-of-order issue/execution architecture core to be included in a processor according to embodiments of the invention.

FIGS. 13A-B illustrate a block diagram of a more specific exemplary in-order core architecture, which core would be one of several logic blocks (including other cores of the same type and/or different types) in a chip.

FIG. 19 is a block diagram contrasting the use of a software instruction converter to convert binary instructions in a source instruction set to binary instructions in a target instruction set according to embodiments of the invention.

DETAILED DESCRIPTION

Figure 1:
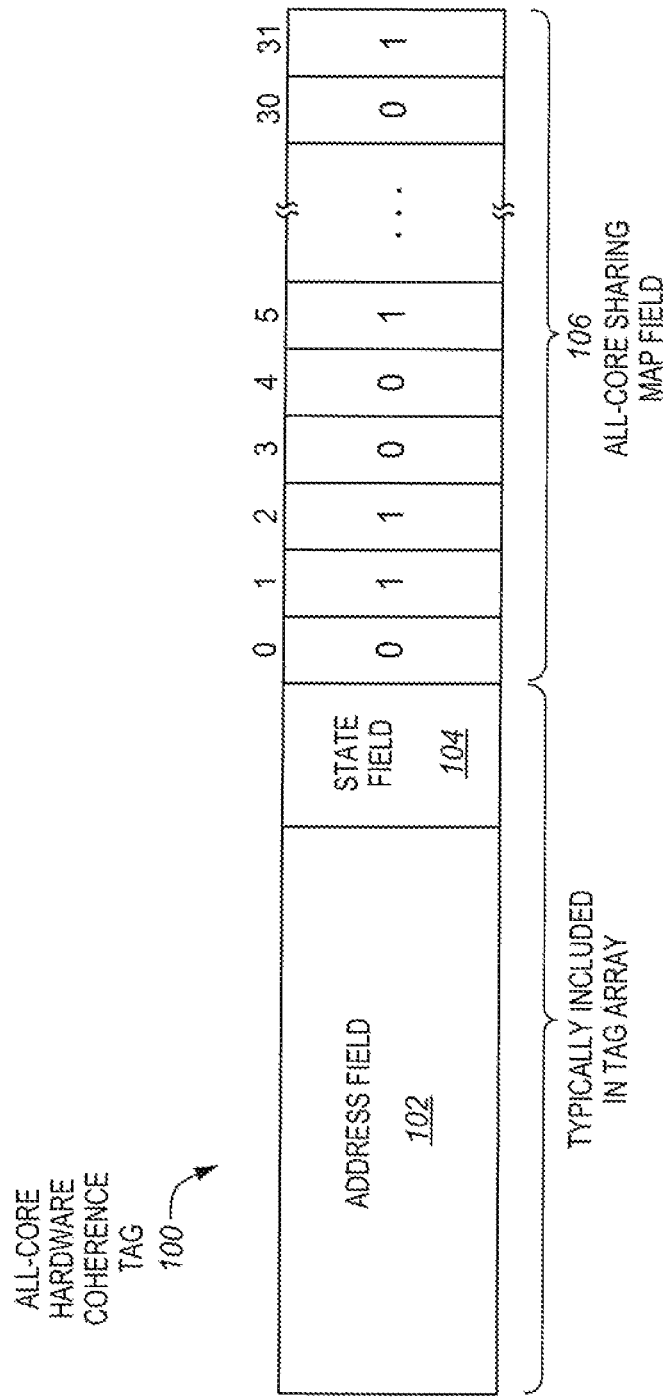
FIG. 1 is a block diagram of a known all-core hardware coherence tag.

In the following description, numerous specific details, such as specific multi-core processors, specific directory configurations, specific array configurations, specific core cluster arrangements, specific logic implementation choices, specific logic partitioning/integration details, and the like, are set forth. However, it is understood that embodiments of the invention may be practiced without these specific details. In other instances, well-known circuits, structures and techniques have not been shown in detail in order not to obscure the understanding of this description.

One limitation of all-core hardware coherence tags, all-core sharing maps, and/or all-core sharing map-based hardware coherence directories, is that the sizes of the tags, the maps, and/or the directories tend to increase significantly with increasing numbers of cores. As discussed above, the all-core sharing maps include 1-bit for each of the cores so that if the number of cores increase the number of bits within each of the maps also increases. For example, in the case of 64-cores each of the maps may be 64-bits wide, in the case of 256-cores each of the maps may be 256-bits wide, and in the case of 1024-cores each of the maps may be 1024-bits wide, and so on. Moreover, these maps are typically stored in many sets and ways. Accordingly, as the number of cores increase, the amount of storage space needed to store all of the all-core sharing maps and/or the size of the all-core sharing map-based hardware coherence directories may tend to increase significantly (in fact the rate of increase may tend to accelerate). At some number of cores (e.g., somewhere around 512), the amount of storage space needed to store all of the all-core sharing maps and/or the size of the all-core sharing map-based directory may even surpass the actual cache storage space used to store the data being tracked. Such increased storage space tends to increase the size, power consumption, and manufacturing cost of the device. As a result, such all-core hardware coherence tags, all-core sharing maps, and/or all-core sharing map-based hardware coherence directories do not provide a scalable solution that efficiently scales with increasing numbers of cores. Other more scalable hardware coherence approaches would be useful and would offer certain advantages (e.g., in terms of reduced storage, reduced manufacturing cost, reduced area, reduced power, etc.).

As previously mentioned, in the all-core sharing map-based hardware coherence directory, the number of tags stored in the directory generally equals the total number of tags in the local/private caches of all of the cores to enable tracking distinct cache lines. When cache lines are shared by two or more cores, fewer distinct addresses will generally be tracked by the directory, such that the storage capacity of the directory is not fully utilized in the presence of such sharing. For example, assume each cache line is pair-wise shared by two cores. In this case, only approximately half of the available directory storage capacity is being used. That is, as the amount of sharing increases, the amount of available storage space in the directory may tend to increase. In some embodiments, the increased amount of available storage space in the directory, as a result of sharing of data among cores, may rather be utilized to make the hardware coherence directory more scalable with increasing numbers of cores.

Figure 3:
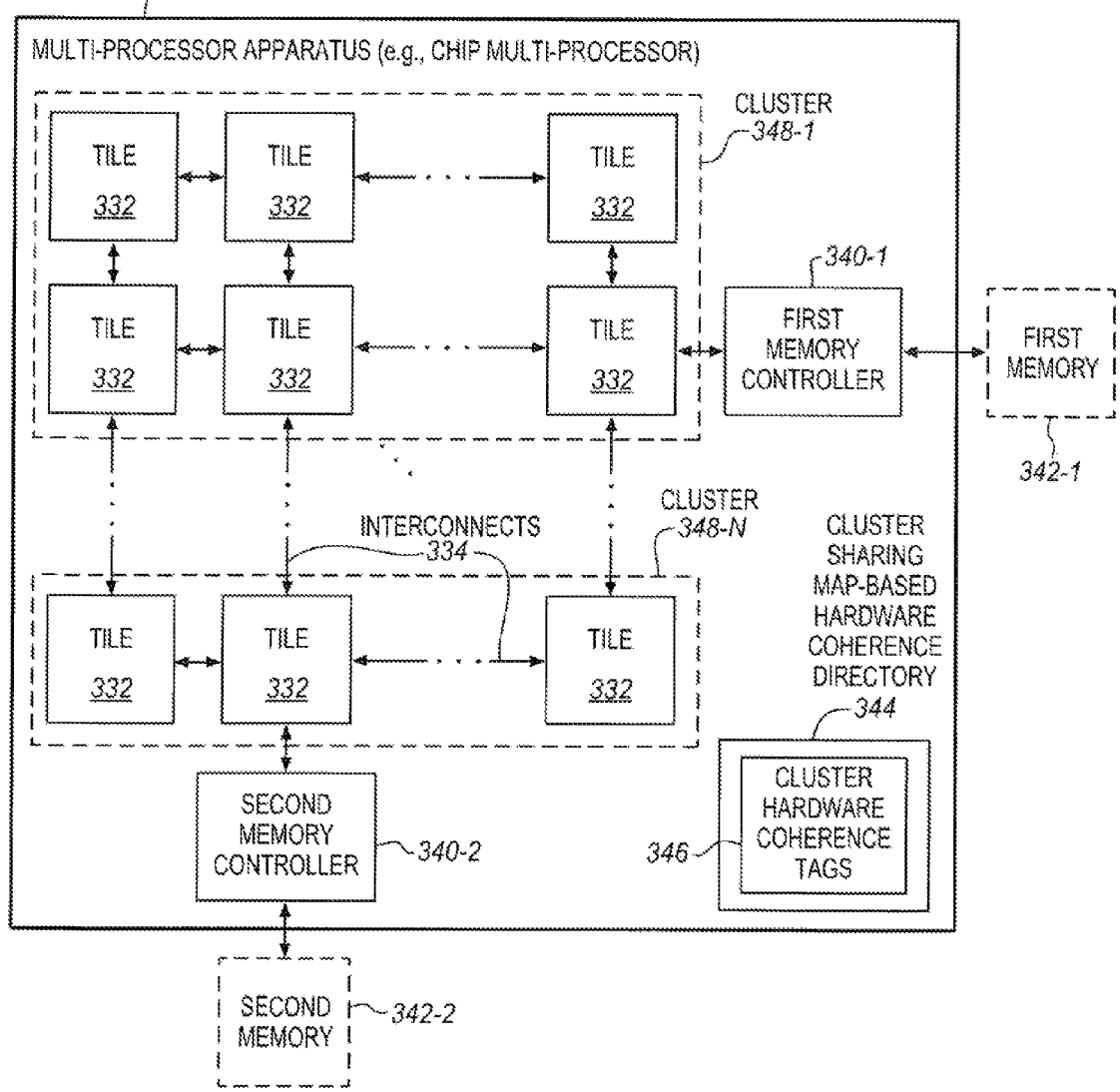
FIG. 3 is a block diagram of an embodiment of a multi-processor apparatus.

FIG. 3 is a block diagram of an embodiment of a multi-processor apparatus 330. In some embodiments, the multi-processor apparatus may represent a multi-core apparatus, such as, for example, a chip multi-processor (CMP). The illustrated multi-processor apparatus includes multiple tiles 332. In the illustrated embodiment, for purposes of illustration, nine tiles are shown. In other embodiments there may be either fewer tiles (e.g., 4, 6, 8, or some other number of tiles) or more tiles (e.g., 16, 32, 64, 80, 100, 128, 256, 512, 1024, more than 1024, or some other number of tiles). There is no requirement for the number of tiles to be an even number or a power of two, although this may often be the case. In the case of a CMP, the tiles are generally all disposed on the same semiconductor substrate (e.g., an integrated circuit die or chip). An interconnect 334 (e.g., an on-die or on-substrate interconnect) couples the tiles together. In various embodiments the interconnect may be configured as a mesh, a torus, a ring, or another known interconnect configuration. The tiles and/or cores are logically grouped into a plurality of clusters 348-1, 348-N, although such grouping may or may not be visible to software applications or operating systems. In various embodiments, hardware, firmware, software, or some combination, may logically group the tiles and/or cores. Generally, some aspects of the grouping (e.g., number of cores per cluster) may be fixed by the hardware, fields, etc.

Figure 4:
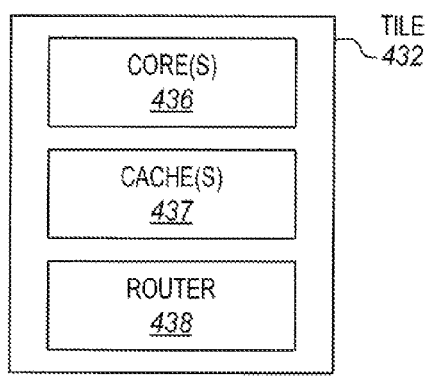
FIG. 4 shows an embodiment of suitable internal components of a representative tile.

FIG. 4 shows an embodiment of suitable internal components of a representative tile 432. The tile includes one or more cores 436. In one embodiment, the tile may include a single core. Alternatively, the tile may include two or more cores. The tile includes one or more local or private caches 437. In one embodiment, the tile may include a single cache. Alternatively, the tile may include two or more levels of local or private caches representing a local or private cache hierarchy. The tile also includes a switch or router 438 to couple the tile with the interconnect 334. In general, various different types of cores, caches, and switches or routers known in the art may be utilized. The other tiles may have either the same, similar, or entirely different internal components. Generally, each of the tiles includes one or more cores and one or more local caches although this is not required.

Referring again to FIG. 3, as shown, in some embodiments, some but not all of the tiles may have a corresponding directly coupled memory controller 340. In the illustration, two memory controllers are shown, namely a first memory controller 340-1 and a second memory controller 340-2. The memory controllers could alternatively be off-chip. Alternate embodiments, may include either fewer or more memory controllers. Moreover, in alternate embodiments the memory controllers may be coupled with the tiles in a different arrangement or configuration (e.g., coupled to different tiles, etc.). Each of the memory controllers is operable to couple with, and provide access to, a corresponding memory 342. In particular, the first memory controller is operable to couple with, and provide access to, a first memory 342-1. The second memory controller is operable to couple with, and provide access to, a second memory 342-2. Each of the first and second memories may be shared by some or all of the tiles and/or cores. In the illustration, the memories are shown in dashed lines to indicate that they are not necessarily part of the multi-processor apparatus, but rather may be system-level components included in a system in which the multi-processor apparatus is deployed. The memories and memory controllers need not be dedicated to any particular one of the clusters.

In some embodiments, each of the cores may be operable to process or run one or more threads. Software is commonly executed as multiple threads on multiple processors (e.g., cores) in order to provide concurrent processing, increase processing throughput, reduce processing time, etc. Each thread may represent a portion of software (e.g., a group of instructions) that can be processed separately from (e.g., independently from and/or concurrently with) other portions (e.g., threads). The threads may process data accessed in the local or private caches within the tile of the core they are running on, accessed in the local or private caches of other cores, and/or accessed in the first and second memories.

The multi-processor apparatus includes an embodiment of a cluster sharing map-based hardware coherence directory 344. The cluster sharing map-based hardware coherence directory is operable to provide hardware-based data coherence for the data shared by the cores and memories. The cluster sharing map-based hardware coherence directory is operable to store cluster hardware coherence tags 346. Further details of the cluster sharing map-based hardware coherence directory and the cluster hardware coherence tags will be provided further below.

Figure 5:
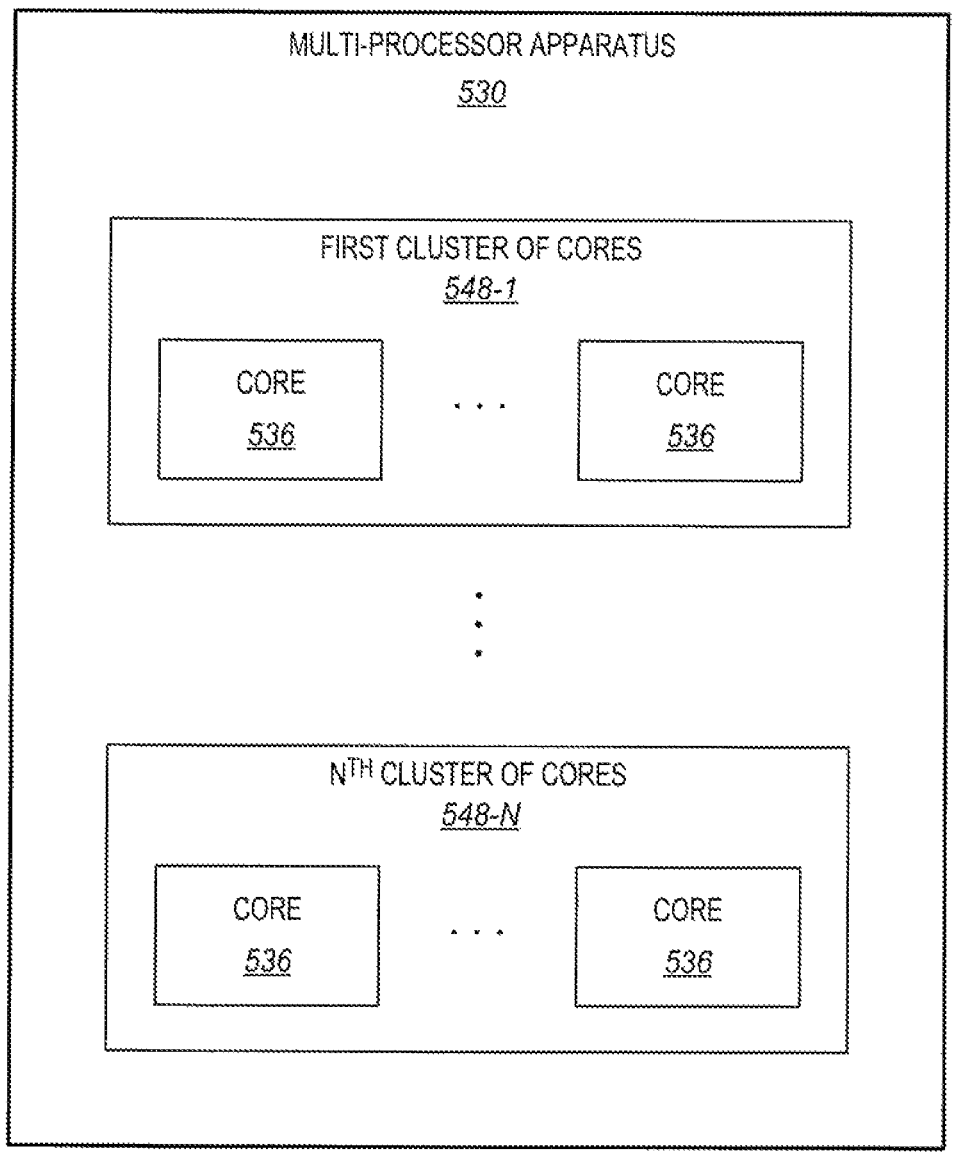
FIG. 5 is a block diagram of an embodiment of a multi-processor apparatus having multiple processors or cores in which the processors or cores are logically grouped into at least two clusters, with each of the clusters including at least two processors or cores.

FIG. 5 is a block diagram of an embodiment of a multi-processor apparatus 530 having multiple processors or cores 536 in which the processors or cores are logically grouped into at least two clusters 548, with each of the clusters including at least two processors or cores. In some embodiments, the multi-processor apparatus may be a chip multi-processor (CMP). In the illustration, a first cluster 548-1 and an Nth cluster 548-N are shown, although there may optionally be more than two clusters. The first cluster includes a plurality of cores 536. The second cluster also includes a plurality of cores 536. In some embodiments, all of the cores of the multi-processor apparatus may be logically grouped into the clusters. Alternatively, one or more of the cores may optionally be omitted from the clusters. In some embodiments, the clusters may all have the same number of cores. Alternatively, the clusters may optionally have different numbers of cores. In some embodiments, each core may be included in one and only one of the clusters. In some embodiments, the clusters may include different non-overlapping sets of cores of equal size. In one aspect, the cores within each cluster may potentially be physically contiguous, adjacent, or neighboring, cores (e.g., on a die or substrate). Alternatively, in another aspect, the cores within each cluster may be physically interleaved (e.g., every fourth core in the physical layout may be in a given cluster), or can have any random combination chosen at boot time, or during some other form of initialization.

Figure 6:
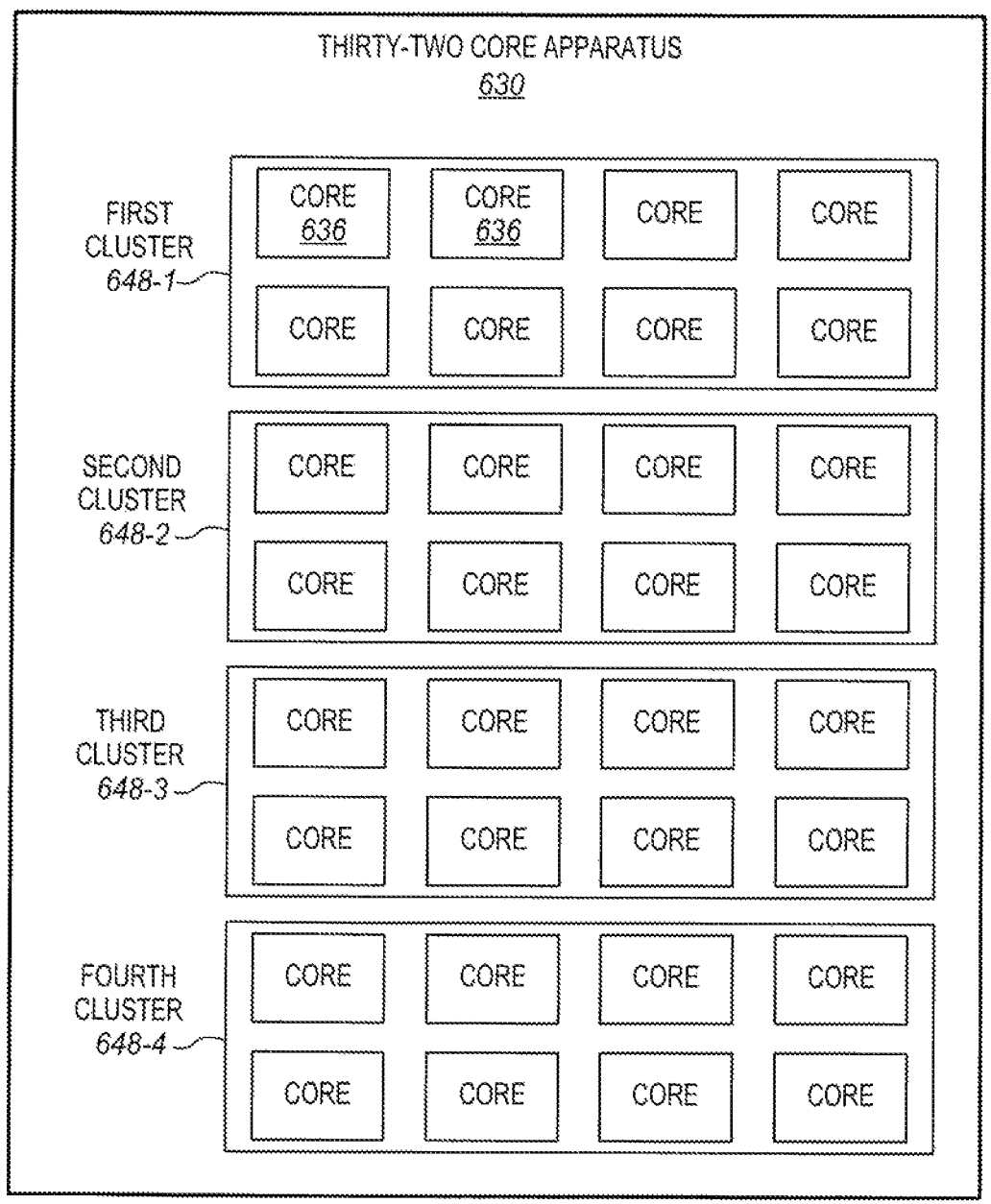
FIG. 6 is a block diagram of a particular example embodiment of a thirty-two core apparatus having thirty-two cores logically grouped into four clusters that each includes a different set of eight of the cores.

FIG. 6 is a block diagram of a particular example embodiment of a thirty-two core apparatus 630 having thirty-two cores 636 logically grouped into four clusters 648 that each include a different set of eight of the cores. In particular, the apparatus includes a first cluster 648-1 having eight cores, a second cluster 648-2 having eight cores, a third cluster 648-3 having eight cores, and a fourth cluster 648-4 having eight cores. In this embodiment, all of the clusters have the same number of cores, each core is included in one and only one of the clusters, and each cluster includes a set of physically contiguous, adjacent, or neighboring, cores. It is to be appreciated that this is just one example. In other embodiments, the cores may be grouped into either fewer or more clusters, with the clusters including either fewer or more cores, with the cores distributed between the clusters in different ways, with the clusters including different numbers of cores, etc.

Figure 7:
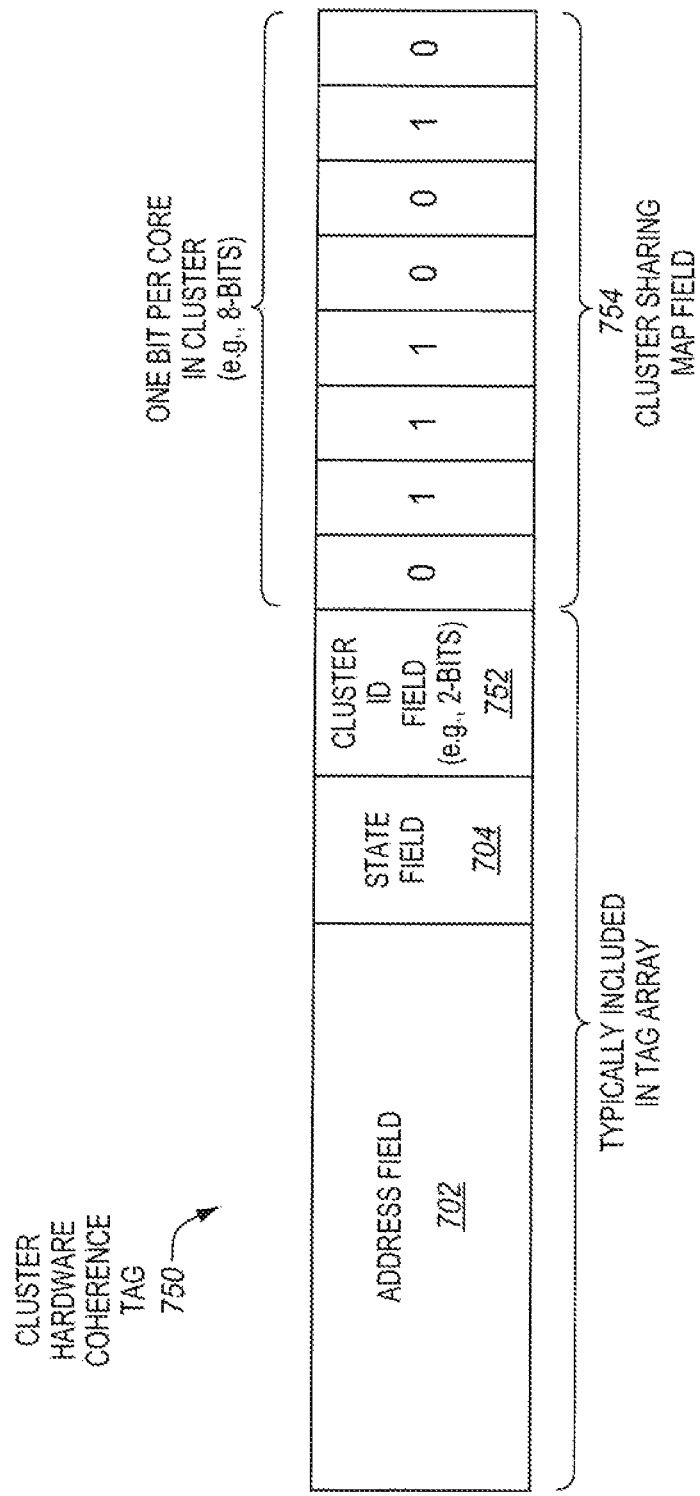
FIG. 7 is a block diagram of an embodiment of a cluster hardware coherence tag.

FIG. 7 is a block diagram of an embodiment of a cluster hardware coherence tag 750. The cluster hardware coherence tag has a scope of a cluster of cores (i.e., a subset of the cores), not all of the cores as in the case of the all-core hardware coherence tag 100 shown in FIG. 1, and the cluster hardware coherence tag is operable to indicate sharing of data among any or all of the cores within a single cluster.

The cluster hardware coherence tag includes an address field 702 and a state field 704. The address field and the state field may be similar to, or the same as, conventional address fields and state fields known in the arts. The address field may indicate an address. In some embodiments, the address field may have a length of 33-bits. The state field may indicate a state of the corresponding data or entry in the directory (e.g., whether the data or entry is valid or invalid). In some embodiments, the state field may have a length of two bits. The two bits may indicate any of four different states. For example, in one aspect they may be MESI states or other similar states known in the art. Some directories don't distinguish between the modified (M) and exclusive (E) states but instead always assume that a cached copy could be modified.

The cluster hardware coherence tag also includes a cluster identifier (ID) field 752. The cluster ID field is operable to uniquely identify the particular cluster which the cluster hardware coherence tag corresponds to. By way of example, if there are four clusters, the cluster ID field may have a length of two bits, and binary 00 in the cluster ID field may indicate a first cluster, binary 01 cluster ID field may indicate a second cluster, binary 10 in the cluster ID field may indicate a third cluster, and binary 11 in the cluster ID field may indicate a fourth cluster. Alternatively, if there are more or less clusters the cluster ID field may have a longer or shorter length in bits.

The cluster hardware coherence tag also includes a cluster sharing map field 754. The cluster sharing map field has a scope of a cluster of cores (i.e., a subset of the cores), not all of the cores as in the case of the all-core sharing map field 106 shown in FIG. 1. The cluster sharing map field is operable to indicate intra-cluster sharing of data identified by and/or corresponding to the address field among any or all of the cores within a single cluster identified by the corresponding cluster identifier field. In some embodiments, the cluster sharing map field may include 1-bit for each of the cores within the cluster. In the illustrated embodiment, the cluster sharing map field has a length of 8-bits. Each of the 8-bits corresponds to a different one of eight cores within a single cluster. By way of example, as shown in FIG. 6, the cores of a thirty-two core apparatus may be logically grouped into four clusters each having eight cores. Alternatively, if there are more cores in the cluster the field may have more bits. The 1-bit corresponding to a given core is operable to indicate whether or not the given core is caching a copy of the data. According to one possible convention, a binary value of 1 (i.e., the bit being set) may be used to indicate that the given core is caching a copy of the data, whereas a binary value of 0 (i.e., the bit being cleared) may be used to indicate that the given core is not caching a copy of the data. Alternatively, the opposite convention may be used. Advantageously, the length in bits of the cluster sharing map field is less than the length in bits of the all-core sharing map field. The all-core sharing map field has a scope of all cores of the apparatus, whereas the cluster sharing map field has a scope of cores only within a single cluster and all of the cores of the apparatus are divided or partitioned among at least two clusters. As a result, the amount of storage space needed to store all cluster sharing map fields is less than that needed to store all of the all-core sharing map fields. This reduced storage space may offer advantages such as reduced size, reduced power consumption, reduced manufacturing cost, etc. This is especially true when the number of cores becomes greater than about thirty-two. This may also help to provide continued support for the widely used shared memory programming model, which is prevalent on many Intel Architecture based processors, when the number of cores or processors increases, which may help to allow existing applications to be run without change.

The illustrated cluster hardware coherence tag is just one illustrative example. In other embodiments, the fields of the tag may have different sizes, the fields of the tag may be arranged differently (e.g., the order of the fields may be shuffled around), additional fields may be included in the tags, etc. Moreover, it is not required that the bits of the fields be contiguous. Rather, the bits of a field may be interleaved or dispersed with bits of other fields if desired.

Figure 8:
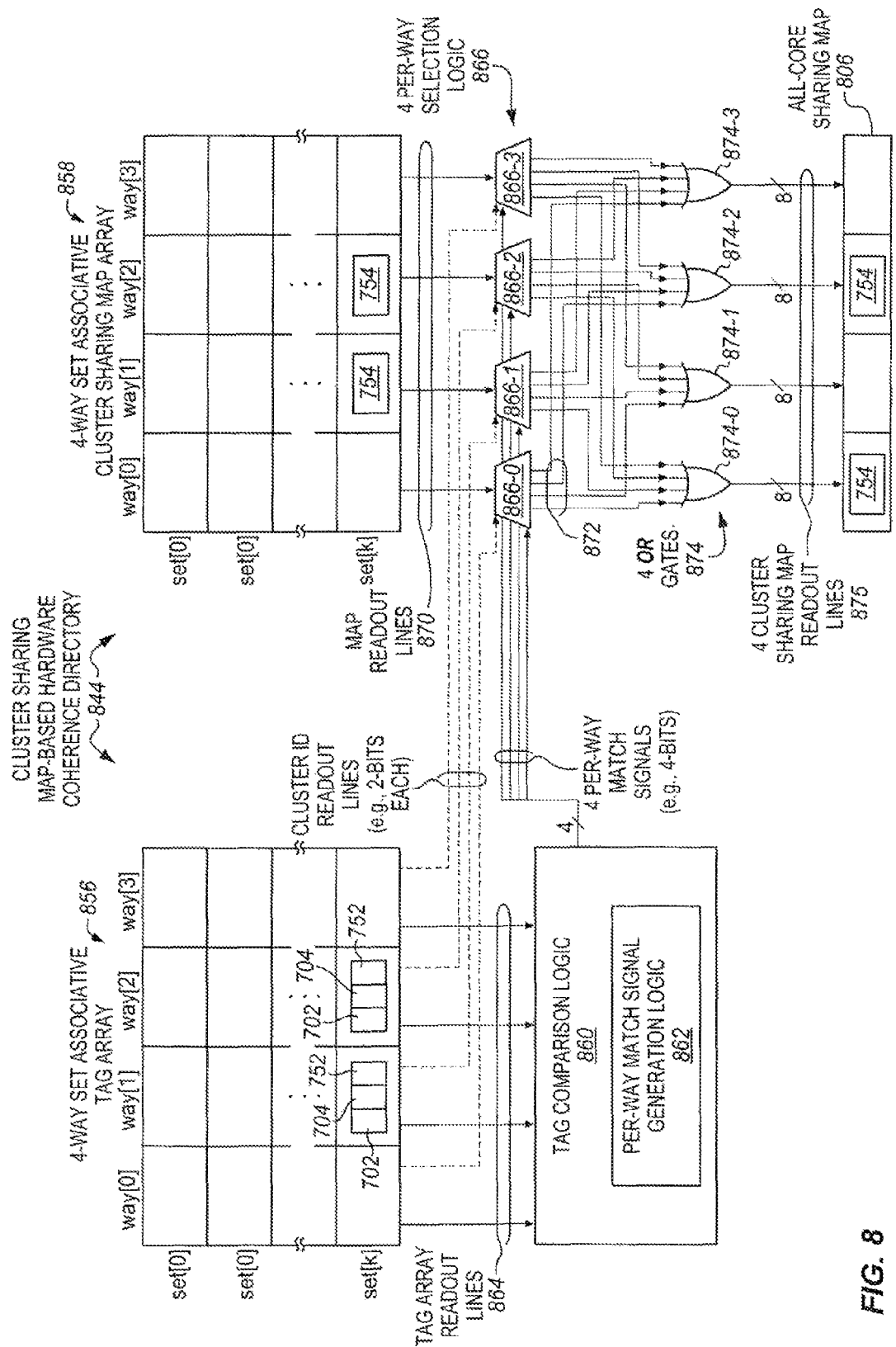
FIG. 8 is a block diagram of an embodiment of a cluster sharing map-based hardware coherence directory.

FIG. 8 is a block diagram of an embodiment of a cluster sharing map-based hardware coherence directory 844. In various embodiments, the cluster sharing map-based hardware coherence directory 844 may be used in the multi-processor apparatus 330 of FIG. 3, the multi-processor apparatus 530 of FIG. 5, the thirty-two core apparatus 630 of FIG. 6, or an entirely different multi-core or multi-processor apparatus. For example, specific or optional details described for the directory 844 may also optionally be used for the directory 344. In some embodiments, the directory may be visible to and/or used by all of the cores of a multi-core apparatus.

The directory is set associative and includes a tag array 856 and a data cluster sharing map array 858. In the illustrated embodiment, the tag array is 4-way set associative and the cluster sharing map array is 4-way set associative. Alternatively, S-way set associative, or other desired arrangements may optionally be used. There is a one-to-one correspondence between ways in the tag and cluster sharing map arrays. The tag array is arranged as (k+1)-sets, labeled set[0] thorough set[k], and four ways, labeled way[0] through way[3]. The number of sets may be any desired integer number (e.g., a number conventionally used in tag arrays), but typically a power of 2. The cluster sharing map array is also arranged as (k+1)-sets, labeled set[0] thorough set[k], and four ways, labeled way[0] through way[3]. Alternatively, fewer or more ways (e.g., eight ways) may optionally be used. In other embodiments, the tag and cluster sharing map arrays may be merged together into a single array.

In some embodiments, address fields, state fields, and cluster ID fields, may be included in the tag array 856. For example, as shown, set[k] includes corresponding address fields 702, state fields 704, and cluster ID fields 752 in each of way[1] and way[2]. In embodiments, the cluster sharing map fields may be included in the cluster sharing map array 858. For example, as shown, set[k] includes cluster sharing map fields 754 in each of way[1] and way[2]. The address, state, and cluster ID fields in way[1] and way[2] of set[k] of the tag array respectively correspond to the cluster sharing map fields in way[1] and way[2] of the cluster sharing map array within a corresponding way.

During operation, it may be desired to know which among all of the cores of the apparatus are sharing data corresponding to a given address. Without limitation to the invention, there are various possible reasons to want to know this. Examples of possible reasons include, but are not limited to, in order to maintain coherence (e.g., in order to change the state of the data), in order to share the data between cores, etc. By way of example consider the case of sharing data between cores. When a given core is seeking the data corresponding to the given address, it may use the given address to check one or more of its corresponding local caches. If the sought data is not found in the local cache(s), then the cluster sharing map-based hardware coherence directory 844 may be consulted to determine which if any of the other cores have the sought data. This may be performed prior to accessing system memory, which generally tends to take more time (e.g., higher access latency). If the cluster sharing map-based hardware coherence directory indicates that the sought data is present in the local cache(s) of one or more of the other cores of the apparatus, then the sought data may be provided from these cache(s) to the core seeking the data. Alternatively, if the cluster sharing map-based hardware coherence directory indicates that the sought data is not present in the local cache (s) of any of the other cores of the apparatus, then a copy of the sought data may be obtained from the system memory, and the cluster sharing map-based hardware coherence directory may be updated to indicate that the requesting core now has a copy of the data. For example, a cluster hardware coherence tag may be stored in the cluster sharing map-based hardware coherence directory with a bit corresponding to the requesting core set to binary 1 to indicate that it has a copy of the data.

In some embodiments, in order to determine which among all of the cores of the apparatus are sharing data corresponding to a given address, the cluster sharing map-based hardware coherence directory may include logic to generate and output an all-core sharing map 806. In some embodiments, the all-core sharing map 806 may be similar to, or the same as, the all-core sharing map stored in the all-core sharing map field 106 shown in FIG. 1. In some embodiments, the all-core sharing map may be generated from one or a plurality of cluster sharing maps each corresponding to a given address and each corresponding to a different cluster identifier. The logic may rearranging the cluster sharing maps, from positions where they are stored in the cluster sharing map array to positions in the all-core sharing map, based on the different corresponding cluster identifiers.

Advantageously, using the same all-core sharing map may offer certain advantages. For one thing, this may help to make the all-core sharing map (i.e., the output of the directory) compatible with conventional coherence logic and/or coherence protocols. This may help to reduce the amount of changes and validation needed. The coherence logic and/or coherence protocols may not even need to be aware of the changes to how the all-core sharing map is generated. Alternatively, other embodiments are not limited to generating an all-core sharing map that is the same as those shown for FIG. 1.

The cluster sharing map-based hardware coherence directory includes the tag array 856. The tag array is operable to store corresponding pairs of addresses 702 and cluster identifiers 752. Each of the addresses is operable to identify data. Each of the cluster identifiers is operable to identify one of the clusters. The cluster sharing map-based hardware coherence directory also includes a cluster sharing map array 858 that is operable to store cluster sharing maps 754. Each of the cluster sharing maps corresponds to one of the pairs of addresses 702 and cluster identifiers 752. Each of the cluster sharing maps is operable to indicate intra-cluster sharing of data identified by the corresponding address within a cluster identified by the corresponding cluster identifier.

Logic associated with the hardware coherence directory (e.g., a coherence directory controller) may indicate inter-cluster sharing of a given data identified by a given address between clusters (e.g., between a first cluster and a second cluster) by storing different cluster identifiers (e.g., both a first cluster identifier to identify the first cluster and a second cluster identifier to identify the second cluster) in different ways of a same set of the tag array. The logic may also store different corresponding cluster sharing maps (e.g., both a first cluster sharing map to indicate intra-cluster sharing of the given data within the first cluster and a second cluster sharing map to indicate intra-cluster sharing of the given data within the second cluster) in different ways of a same set of the cluster sharing map array. In some embodiments, lookup of the tag and cluster sharing map arrays may be performed sequentially (e.g., with the lookup in the tag array first), whereas in other embodiments the lookup of the tag and cluster sharing map arrays may be performed at least partly or substantially concurrently.

Figure 2:
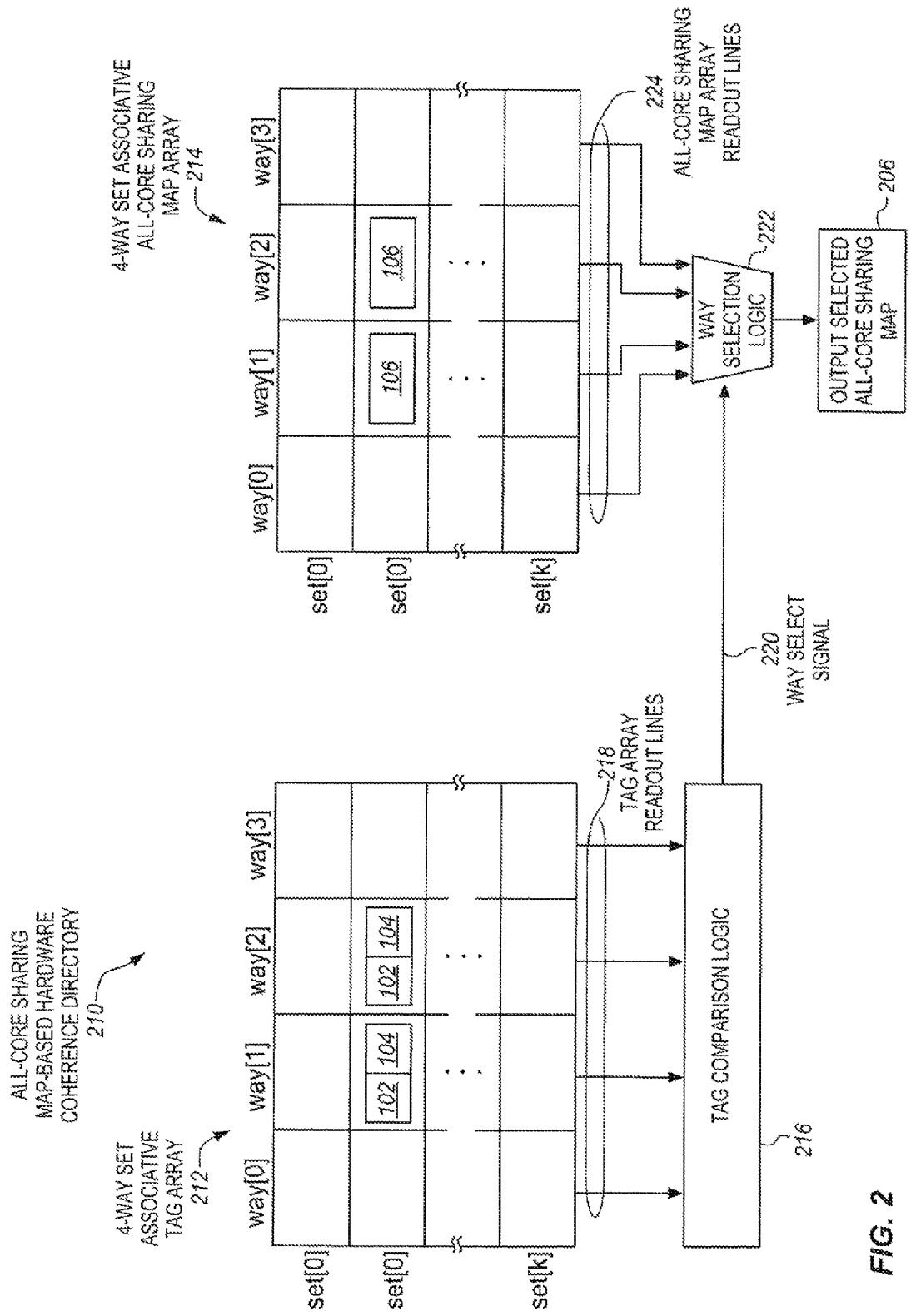
FIG. 2 is a block diagram of a known all-core sharing map-based hardware coherence directory.

The directory includes tag comparison logic 860. The tag comparison logic may compare four addresses, each stored within a different one of the four ways of a set of the tag array, with a given address. The four addresses may be read out on tag array readout lines 864. Either none of the four addresses may match the given address, or for the four-way array one, two, three, or all four of the addresses in the four ways may match the given address. Recall that in the conventional all-core sharing map-based hardware coherence directory 210 of FIG. 2, at most a single address in a single way may match the given address. When there is inter-cluster sharing (i.e., different clusters share data corresponding to a given address), multiple cluster ID fields 752 and address fields 702, each corresponding to a cluster sharing map field 754, may be stored in the same set of the directory. If no unused tags are available in the set, a victim (e.g., a least recently used victim) may be selected to make room for the new cluster sharing map field.

The tag comparison logic includes per-way match signal generation logic 862 that is operable to generate and output four per-way match signals. Each of the four per-way match signals indicates whether or not the comparison by the tag comparison logic indicated an address match for a corresponding way. For example, a first of the four per-way match signals may indicate whether or not an address in way[0] matched, a second of the four per-way match signals may indicate whether or not an address in way[1] matched, a third of the four per-way match signals may indicate whether or not an address in way[2] matched, and a fourth of the four per-way match signals may indicate whether or not an address in way[3] matched. In some embodiments, each of the four per-way match signals may include a single bit. The single bit may have a first binary value (e.g., 1) to indicate that there was a match and a second, different binary value (e.g., 0) to indicate that there was not a match. Each of the four per-way match signals may be provided to a different corresponding one of four per-way selection logic 866 in the same way. A first selection logic 866-0 corresponds to way[0], a second selection logic 866-1 corresponds to way[1], a third selection logic 866-2 corresponds to way[2], and a fourth selection logic 866-3 corresponds to way[3].

Four cluster ID fields 752 (only two of which are shown) each in a different one of the four ways may be read out of the tag array along cluster ID readout lines 868. Each cluster ID field is operable to uniquely identify the particular cluster which the cluster hardware coherence tag and/or the address corresponds to. By way of example, if there are four clusters, each cluster ID field may have a length of two bits, and binary 00 in the cluster ID field may indicate a first cluster, binary 01 cluster ID field may indicate a second cluster, binary 10 in the cluster ID field may indicate a third cluster, and binary 11 in the cluster ID field may indicate a fourth cluster. Alternatively, if there are more or less clusters the cluster ID field may have a longer or shorter length in bits. The cluster ID readout lines may be operable to read out the number of bits for each of the four ways. Each of the four cluster ID fields may be provided to a different corresponding one of four per-way selection logic 866 in the same way. For example, the cluster ID field in way[3] may be provided to the selection logic corresponding to way[3], etc. Recall that the cluster ID fields indicate which cluster the bits of the cluster sharing map fields correspond to.

Four cluster sharing map fields 754 (only two of which are shown), each in a different way of the cluster sharing map array 858, may be read out of the cluster sharing map array on cluster sharing map readout lines 870. Each of the four cluster sharing map fields may be provided to a different corresponding one of the four per-way selection logic 866 in the same way. For example, the cluster sharing map field in way[3] may be provided to the selection logic 866-3 corresponding to way[3], etc. Intra-cluster sharing (i.e., sharing among the cores within a given cluster) may be indicated within a given single cluster sharing map 754, whereas inter-cluster sharing (i.e., sharing among cores in multiple different clusters) may be indicated through multiple different cluster sharing maps, each corresponding to a different cluster, each having the same address, and each in the illustrated embodiment included in the same set.

Accordingly, each of the four per-way selection logic receives three inputs. Namely, each of the four per-way selection logic receives a corresponding way match signal corresponding to the same way from the tag comparison logic, a corresponding cluster ID field corresponding to the same way from the tag array, and a corresponding cluster sharing map corresponding to the same way from the cluster sharing map array. Each of the four per-way selection logic is operable to select either the received/input cluster sharing map or a predetermined value that is operable to indicate no cores within the cluster are sharing the data based on the received/input way match signal. For example, in a convention where a binary value of 1 in the cluster sharing map indicates the corresponding core is sharing data, the predetermined value may have 8-bits cleared bits equal to binary 0 when there are eight cores in the cluster. In some embodiments, when the received/input way match signal indicates there is a match the received/input cluster sharing map is selected, whereas when the way match signal indicates there is no match the predetermined value indicating no cores are sharing the data is selected.

Each of the four per-way selection logic has four outputs 872. Each of the four outputs from a given one of the four per-way selection logic is coupled with an input of a different corresponding one of four OR gates 874. The four OR gates represent an embodiment of cluster sharing map alignment and/or repositioning logic. The four outputs of the selection logic corresponding to way[0] are each coupled with a different one of the four OR gates, the four outputs of the selection logic corresponding to way[1] are each coupled with a different one of the four OR gates, and so on. Each of the selection logics is operable to de-multiplex, route, or otherwise provide the selected value (e.g., either the received/input cluster sharing map or the predetermined value) to one of the four OR gates based on the corresponding received/input cluster ID field. In some embodiments, the cluster sharing maps for the clusters are not placed in the tag array 856 in an order required by their cluster IDs. For example, a cluster sharing map for a first cluster and/or cluster ID may be placed in any of the ways in the tag array. Such routing or moving of the selected values may be used to rearrange the selected values (e.g., the cluster sharing maps) to appropriate positions within the all-core sharing map 806.

In some embodiments, each of the clusters corresponds to a different fixed or predetermined position within the all-core sharing map. For example, in the illustrated embodiment, there are four clusters, there are four positions within the all-core sharing map each operable to contain a different cluster sharing map, and each of the clusters corresponds to a different fixed or predetermined one of the four positions within the all-core sharing map. For example, a first cluster (e.g., identified by cluster ID 00) corresponds to the way[0] position in the all-core sharing map, a second cluster (e.g., identified by cluster ID 01) corresponds to the way[1] position in the all-core sharing map, a third cluster (e.g., identified by cluster ID 10) corresponds to the way[2] position in the all-core sharing map, and a fourth cluster (e.g., identified by cluster ID 11) corresponds to the way[3] position in the all-core sharing map. This is just one possible example. Each of the OR gates may output or provide the input they receive from any of the four selection logic to a corresponding position in the all-core sharing map 806. Accordingly, in some embodiments, the cluster sharing map-based hardware coherence directory includes cluster sharing map rearrangement or routing logic to rearrange or route cluster sharing maps corresponding to different clusters into an arrangement suitable for the all-core sharing map 806. Where there is inter-cluster sharing, and multiple cluster sharing maps each corresponding to the same address are stored within the same way, these cluster sharing maps are routed or rearranged into the positions of the all-core sharing map appropriate for their corresponding cluster. It is not required to use the particular selection logic and OR gates shown. Other embodiments may use other configurations of selection and Boolean logic to perform the rearrangement. Still other embodiments may include shifting and merging logic to perform the rearrangement. In the above description a sequential lookup into the tag and cluster sharing map arrays has been described, although other embodiments may perform at least partially concurrent tag and cluster sharing map array lookup.

Accordingly, as described above in conjunction with FIG. 8, a comparatively small amount of static storage for tracking data sharing may be allocated. When the amount of sharing increases beyond the static amount, the information to track the additional sharing/sharers may be opportunistically spilled into available or unused space in the directory that results from the sharing. Advantageously, this may help to avoid needing to statically allocate an amount of storage space for the maximum possible amount of sharing, which is generally not the common case for most applications. Reducing the total amount of storage needed for the directory may help to reduce the size, manufacturing cost, and/or power consumption for the directory. Moreover, this may also help to provide continued support for the widely used shared memory programming model, which is prevalent on many Intel Architecture based processors, when the number of cores or processors increases, which may help to allow existing applications to be run without change.

In some embodiments, rather than a single physical directory, a distributed directory may be utilized. For example, in some embodiments, each core may have a corresponding distributed "slice" or other portion of the directory. For example, if there are thirty-two cores, there may be thirty-two per-core slices of the directory each located proximate a corresponding one of the cores (e.g., within a tile having the core). In some embodiments, each slice and/or each core may have a unique predefined address range. For example, if there are thirty-two cores and/or slices, any given address may uniquely map to one of the thirty-two cores and/or slices referred to as a home slice for that given address. By way of example, one way to implement this is to have each possible value of the first five bits of the address uniquely correspond to a different one of the thirty-two slices. For example, all addresses with the first five bits 11111 may correspond to the same slice. All other slices may have a different value for these first five bits of the address. Alternatively, some embodiments may choose to hash the address differently to derive a home slice.

Figure 9:
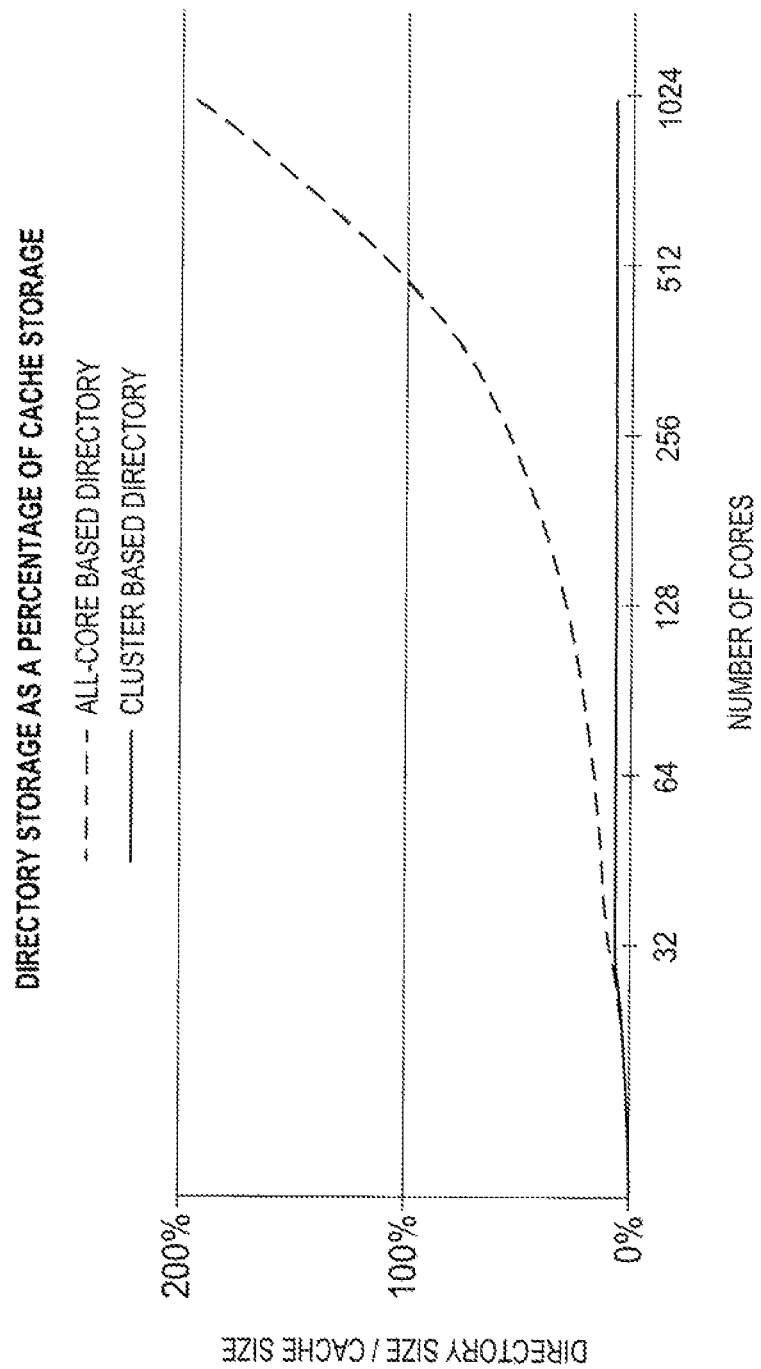
FIG. 9 is a graph plotting directory storage as a percentage of cache storage as a function of number of cores for a conventional all-core shared map-based hardware coherence directory and a cluster shared map-based hardware coherence directory.

FIG. 9 is a graph plotting directory size as a percentage of cache size as a function of number of cores for a conventional all-core shared map-based hardware coherence directory (e.g., per the approach shown in FIG. 2) and a cluster shared map-based hardware coherence directory (e.g., per the approach shown in FIG. 8). Directory size as a percentage of cache size is plotted on the vertical axis. Number of cores is plotted on the horizontal axis. As can be readily seen, especially when the number of cores is approximately thirty-two or more, the conventional all-core shared map-based hardware coherence directory tends to have a much higher percentage of directory size to cache size than the cluster shared map-based hardware coherence directory. When there are about 512 or more cores, the conventional all-core shared map-based hardware coherence directory may consume as much storage space as used for the actual cache. By contrast, the cluster shared map-based hardware coherence directory has a relatively flat dependency on increasing number of cores beyond about thirty-two cores. This graph clearly shows that the cluster shared map-based hardware coherence directory is much more scalable than the conventional all-core shared map-based hardware coherence directory. It is to be appreciated that embodiments are applicable to even small numbers of cores although as explained elsewhere herein advantages of reduced directory storage space are especially incurred for large core counts of at least sixteen or more.

Figure 10:
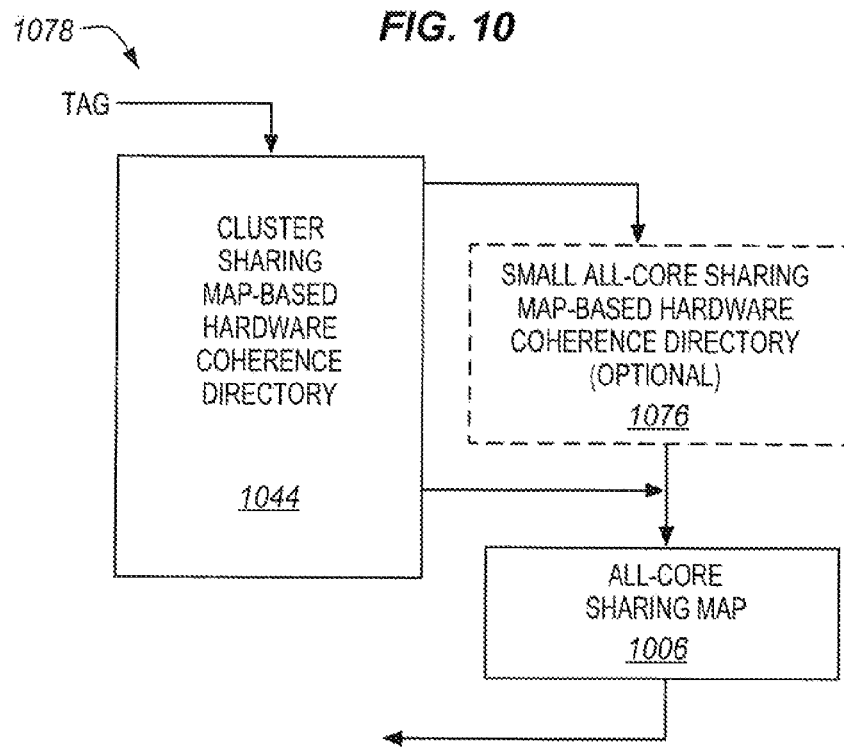
FIG. 10 is a block diagram of a first embodiment of hardware coherence logic that includes a cluster sharing map-based hardware coherence directory and an optional small all-core sharing map-based hardware coherence directory that are accessed in sequentially.

FIG. 10 is a block diagram of a first embodiment of hardware coherence logic 1078 that includes a cluster sharing map-based hardware coherence directory 1044 and an optional small all-core sharing map-based hardware coherence directory 1076 that are accessed in series. The cluster sharing map-based directory may be similar to, or the same as, those described elsewhere herein. In some embodiments, the small all-core sharing map-based directory may be similar to the known all-core sharing map-based directory 210 of FIG. 2 except that it is relatively smaller (e.g., has fewer entries). The features described above for the directory 210 are also relevant to the directory 1076. The small all-core sharing map-based coherence directory may store corresponding pairs of addresses and all-core sharing maps. In various embodiments, the small all-core sharing map-based directory may have no more than about 20, 15, or 10 entries per core and/or slice. For example, in various embodiments, the small all-core sharing map-based directory may have about 1 to 20, about 2 to 20, about 4 to 15, or about 6 to 15 entries per core and/or slice. By contrast, the known all-core sharing map-based directory 210 commonly includes many more entries. For example, the number of entries may be equal to the total number of possible cache lines. For instance, if each private cache is 256 KB with 64-bit line size, each directory slice may have around 4096 entries (i.e., 256*1024/64).

In some embodiments, the all-core sharing map-based and the cluster sharing map-based directories may track non-overlapping or mutually exclusive sets of addresses. For example, the small all-core sharing map-based directory may store all-core sharing maps when the number of clusters sharing data exceeds a threshold and/or exceeds the associativity of the cluster sharing map-based directory. If a tag is to be added to the cluster sharing map-based directory, but it would result in the number of tags exceeding the threshold and/or the associativity, then all tags for the corresponding address may be marked as invalid in the cluster sharing map-based directory and an all-core sharing map indicating equivalent sharing may be created and stored in the small all-core sharing map-based directory.

The relatively small size of the small all-core sharing map-based directory is appropriate for various different types of data sharing patterns. One common data sharing patter is that a relatively large degree of sharing of a relatively few number of addresses (e.g., for semaphores). Active semaphores are generally relatively few in number for a given application. Consequently, a small number of entries in the small all-core sharing map-based directory are generally sufficient for semaphores. Another common data sharing pattern is that of widely shared read only data for a large number of different addresses. The wide sharing of the data generally significantly reduces the number of distinct addresses. For example, consider a 256 kilo byte private L2 cache/tile with 4096 entries (64-byte cache line size) for a 1024 core design. If all lines are shared, then there are only 4096 distinct addresses. Since there are 1024 cores and/or slices, there are only about 4 (i.e., 4096/1024) entries per core and/or slice. For other numbers of cores, the number would be the number of distinct addresses divided by the number of cores or slices. If desired, more (e.g., between about 4 to 10) may optionally be included (e.g., to help account for non-uniform address distribution and/or one slice having a disproportionate amount of addresses). Yet another common data sharing pattern is that of random sharing among a few addresses. For random sharing across a few cores, the cluster sharing map based hardware coherence directories described elsewhere herein are should suffice for inter-cluster sharing. Since these types of accesses tend to be relatively few in number, the side-effects of these can generally be ignored without significant performance impact. Alternatively, a slightly larger cache may be included to help mitigate the side-effects of the few randomly shared lines.

Accordingly, the number of entries generally tends to be relatively small, such as no more than about twenty entries per core or slice. There is no precise number that is required, but rather there is flexibility in the actual number, although with some performance versus area/power tradeoff. Generally, relatively more entries per core or slice (although often no more than about twenty) tends to provide relatively better performance, but to have relatively larger area and larger power consumption. Conversely, relatively fewer entries per core or slice (although often at least 1-2), tends to provide smaller area and smaller power consumption, but to have relatively worse performance. Those skilled in the art will appreciate that the actual number may be selected for the particular implementation depending on factors such as the number of cores, the sizes of the caches, the types of data sharing patterns expected, the performance, area, and power objectives, etc.

When selecting victims in the cluster sharing map-based directory and/or the small all-core sharing map-based directory, conventional victim selection approaches known in the arts may optionally be used. For example, in some embodiments, a least recently used (LRU) approach may be used. If desired, more sophisticated approaches may optionally be used. For example, in addition to considering recent use (e.g., as in the case of LRU approaches), other factors such as the number of sharers may optionally be considered. In some embodiments, if there are multiple tags for an address of a selected victim in the cluster sharing map-based directory, all of these tags may optionally be invalidated and/or removed from the cluster sharing map-based directory, and an all-core sharing may optionally be added to the small all-core sharing map-based directory.

Referring again to FIG. 10, in the illustrated first embodiment, the cluster sharing map-based and small all-core sharing map-based directories are shown to be accessed in series. In particular, in the illustrated embodiment, the cluster sharing map-based directory is shown to be accessed prior to the small all-core sharing map-based directory. Commonly, the cluster sharing map-based directory has a higher hit rate than the small all-core sharing map-based directory and it is more efficient to access the cluster sharing map-based directory first. During use an address (e.g., from a directory controller) may be used to perform a lookup in the cluster sharing map-based directory. If the address is found to have one or more matching tags in the cluster sharing map-based directory, then an all-core sharing map 1006 may be regenerated from one or more matching cluster sharing maps as described elsewhere herein and output (e.g., written to an all-core sharing map register accessible to the directory controller). Alternatively, if there is a miss in the cluster sharing map-based directory, the small all-core sharing map-based directory may be accessed. As shown in the illustration, in some cases the cluster sharing map-based directory may access the small all-core sharing map-based directory. In other cases, the directory controller may access the small all-core sharing map-based directory. If the tag is found to have a match in the small all-core sharing map-based directory, then an intact all-core sharing map 1006 stored in the small all-core sharing map-based directory may be selected and output (e.g., written to an all-core sharing map register). If desired, the directory controller may optionally be informed of whether there is a hit in the cluster sharing map-based directory and/or the small all-core sharing map-based directory. Such a serial lookup generally tends to be more energy efficient, as compared to a parallel lookup, and may be used to help reduce power consumption.

Figure 11:
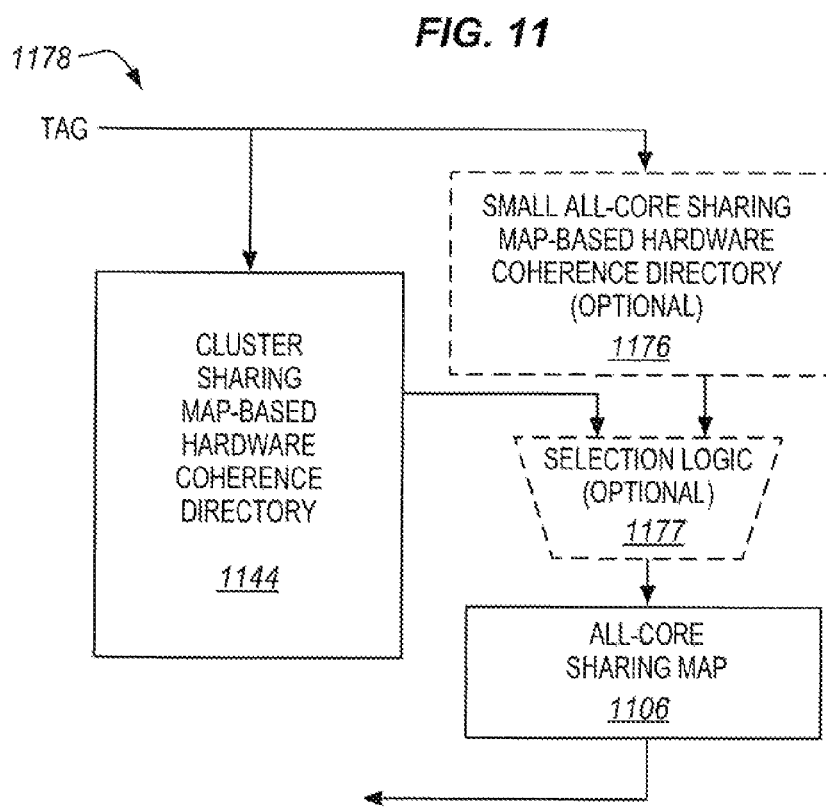
FIG. 11 is a block diagram of a second embodiment of hardware coherence logic that includes a cluster sharing map-based hardware coherence directory and an optional small all-core sharing map-based hardware coherence directory that are accessed concurrently.

FIG. 11 is a block diagram of a second embodiment of hardware coherence logic 1178 that includes a cluster sharing map-based hardware coherence directory 1144 and an optional small all-core sharing map-based hardware coherence directory 1176 that are accessed in parallel. During use an address (e.g., from the directory controller) may be used to concurrently perform a lookup in both the cluster sharing map-based directory and the small all-core sharing map-based directory. If the address is found to have one or more matching tags in the cluster sharing map-based directory, then an all-core sharing map 1106 may be regenerated from one or more matching cluster sharing maps as described elsewhere herein and output (e.g., written to an all-core sharing map register). If the address is found to have a matching tag in the small all-core sharing map-based directory, then an intact all-core sharing map 1106 stored in the small all-core sharing map-based directory may be selected and output (e.g., written to an all-core sharing map register). In some cases, an optional selection logic 1177 may be included to select between the outputs. If desired, the directory controller may optionally be informed of whether there is a hit in the cluster sharing map-based directory and/or the small all-core sharing map-based directory. Such a parallel lookup generally tends to detect matches faster, as compared to a serial lookup, and may be used to help increase performance.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Processor with Integrated Memory Controller and Graphics

Figure 14:
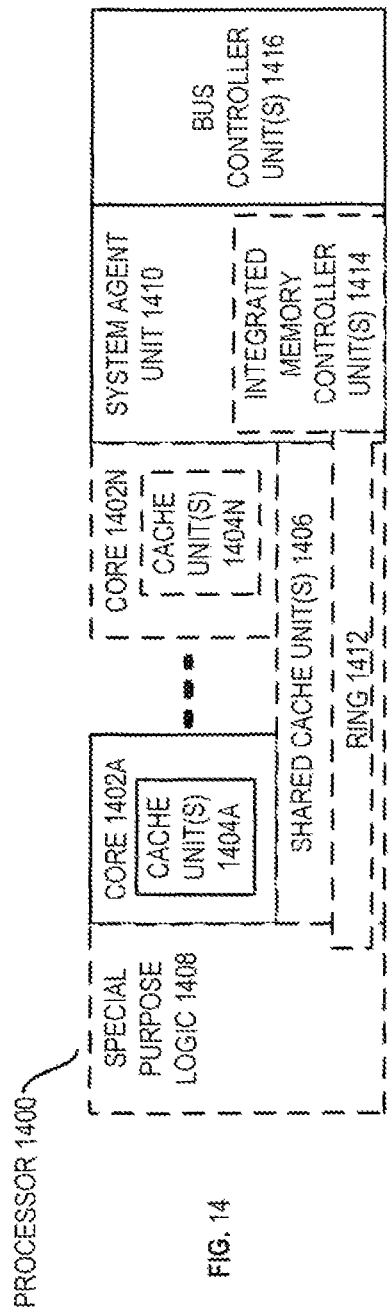
FIG. 14 is a block diagram of a processor that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
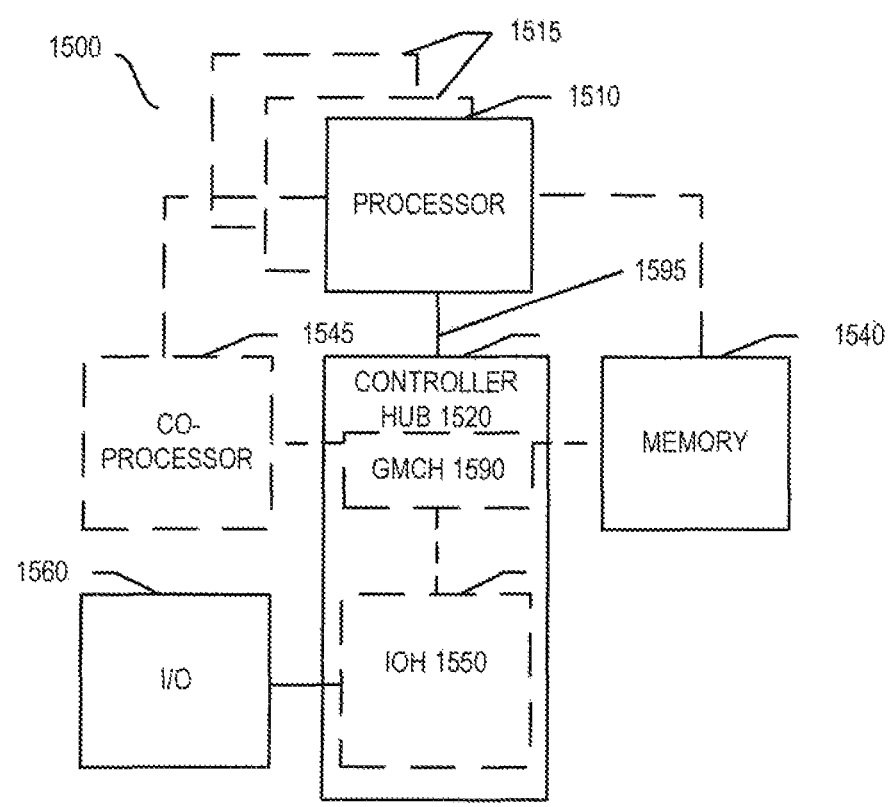
FIG. 15, shown is a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
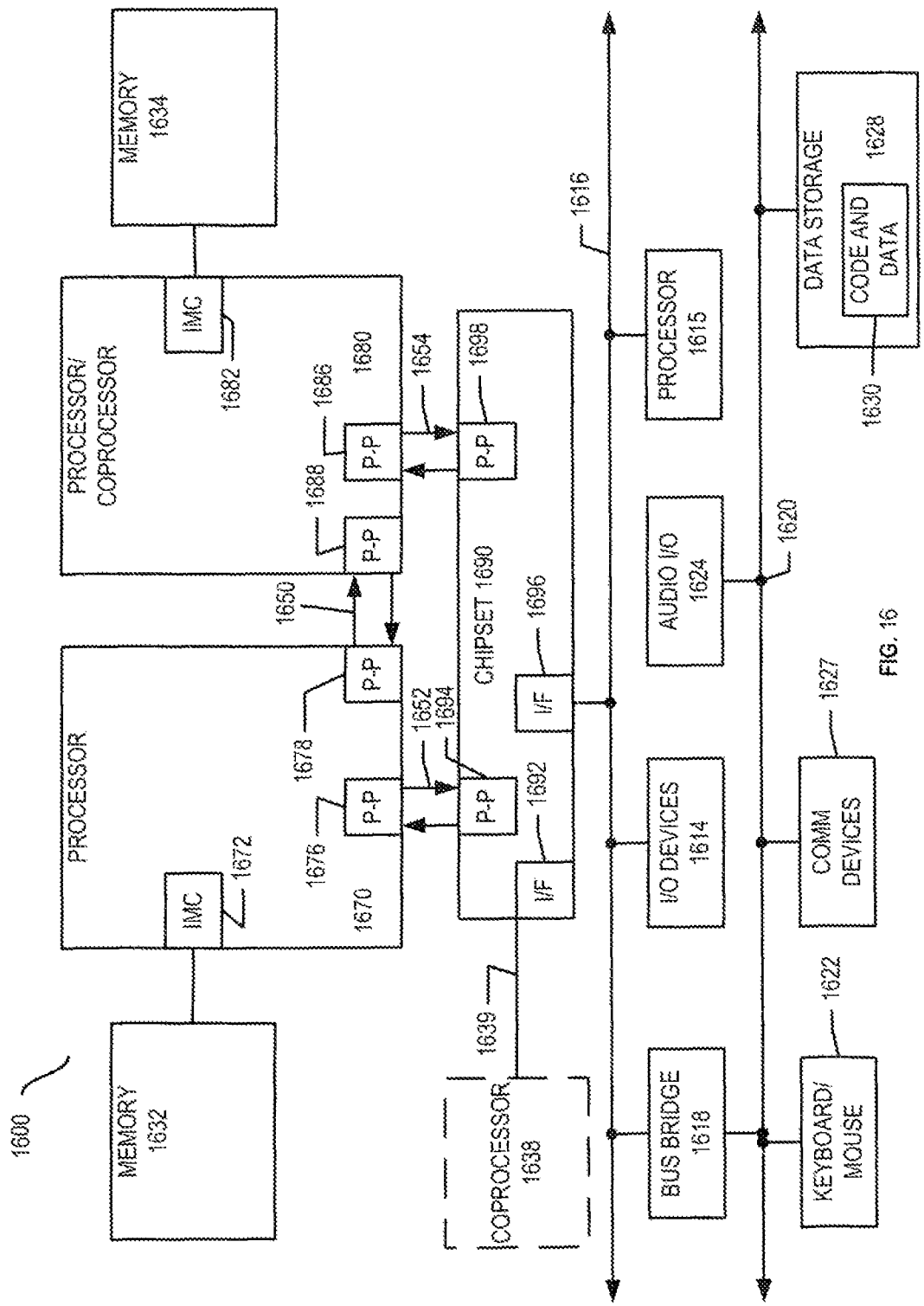
FIG. 16, shown is a block diagram of a first more specific exemplary system 1600 in accordance with an embodiment of the present invention.

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
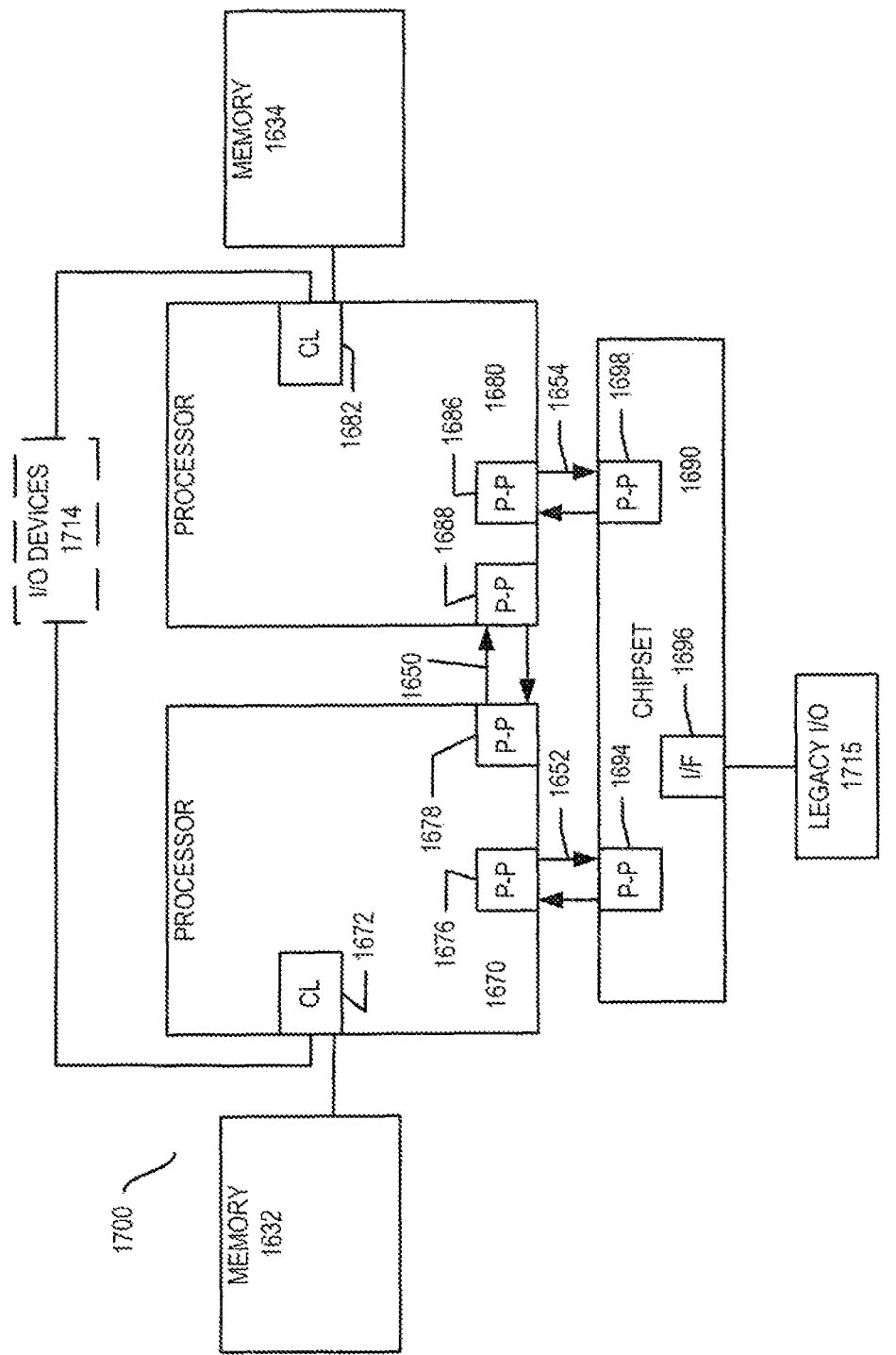
FIG. 17, shown is a block diagram of a second more specific exemplary system 1700 in accordance with an embodiment of the present invention.

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
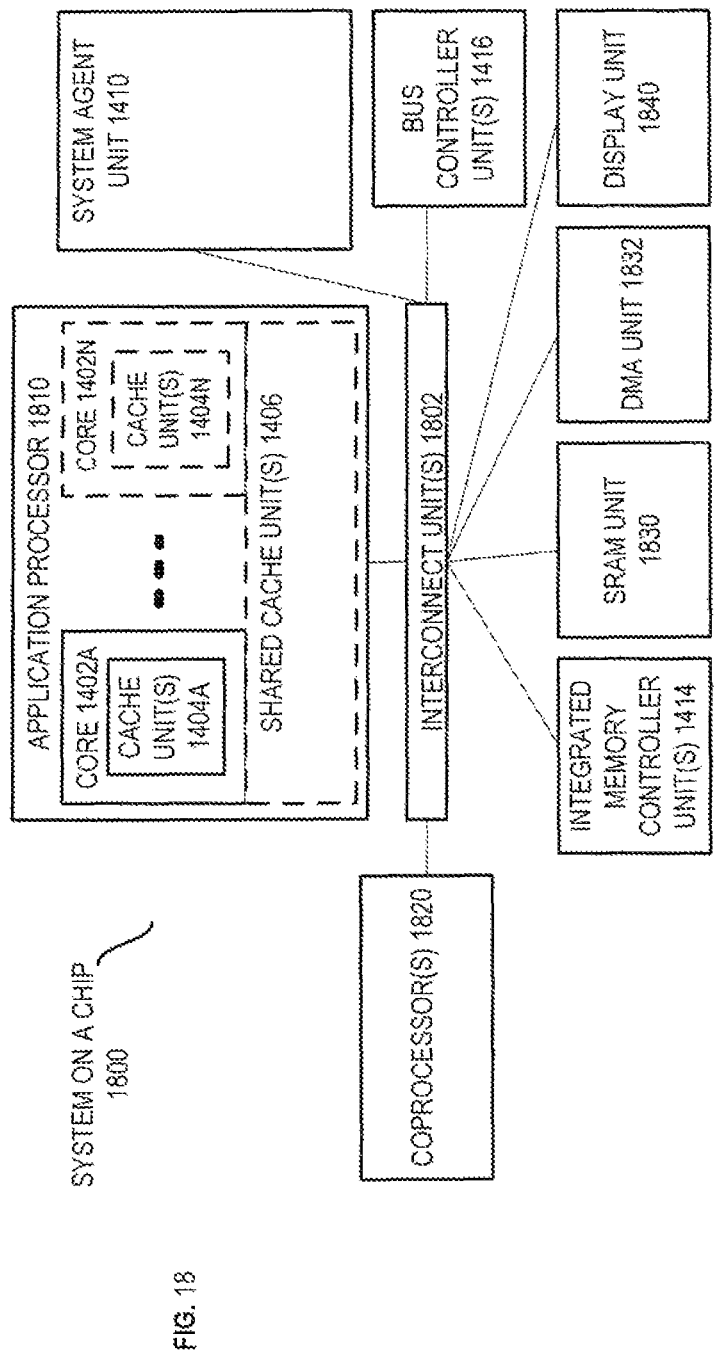
FIG. 18, shown is a block diagram of a SoC in accordance with an embodiment of the present invention.

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 202A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

It will also be appreciated, by one skilled in the art, that modifications may be made to the embodiments disclosed herein, such as, for example, to the sizes, configurations, functions, and manner of operation, and use, of the components of the embodiments. All equivalent relationships to those illustrated in the drawings and described in the specification are encompassed within embodiments of the invention. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The following clauses and/or examples pertain to further embodiments. Specifics in the clauses and/or examples may be used anywhere in one or more embodiments.

In one embodiment, a first apparatus includes a plurality of cores. The plurality of cores are logically grouped into a plurality of clusters. A cluster sharing map-based coherence directory is coupled with the plurality of cores and is to track sharing of data among the plurality of cores. The cluster sharing map-based coherence directory includes a tag array to store corresponding pairs of addresses and cluster identifiers. Each of the addresses is to identify data. Each of the cluster identifiers is to identify one of the clusters. The cluster sharing map-based coherence directory also includes a cluster sharing map array to store cluster sharing maps. Each of the cluster sharing maps corresponds to one of the pairs of addresses and cluster identifiers. Each of the cluster sharing maps is to indicate intra-cluster sharing of data identified by the corresponding address within a cluster identified by the corresponding cluster identifier.

Embodiments include the first apparatus in which the clusters logically group non-overlapping sets of cores of equal size.

Embodiments include any of the above first apparatus in which a pair of an address and a cluster identifier are to be stored in a given set and a given way of the tag array, and in which a cluster sharing map corresponding to the pair is to be stored in a corresponding set and a corresponding way of the cluster sharing map array.

Embodiments include any of the above first apparatus further including logic to indicate inter-cluster sharing of a given data identified by a given address between a first cluster and a second cluster. The logic does this by storing both a first cluster identifier to identify the first cluster, and a second cluster identifier to identify the second cluster, in different ways of a same set of the tag array. The logic does this also by storing both a first cluster sharing map to indicate intra-cluster sharing of the given data within the first cluster, and a second cluster sharing map to indicate intra-cluster sharing of the given data within the second cluster, in different ways of a same set of the cluster sharing map array.

Embodiments include any of the above first apparatus further including logic to generate an all-core sharing map from a plurality of cluster sharing maps, each corresponding to a given address, and each corresponding to a different cluster identifier. The logic does this by rearranging the plurality of cluster sharing maps, from positions where they are stored in the cluster sharing map array, to positions in the all-core sharing map, based on the different corresponding cluster identifiers.

Embodiments include any of the above first apparatus further including tag comparison logic coupled with the tag array. The tag comparison logic is to compare a plurality of addresses in different ways of a same set of the tag array, and to provide a plurality of per-way match signals to indicate whether or not the addresses in the different ways match.

Embodiments include any of the above first apparatus further including a small all-core sharing map-based coherence directory having no more than twenty entries per core of the plurality of cores. The small all-core sharing map-based coherence directory is to store corresponding pairs of addresses and all-core sharing maps. Each of the all-core sharing maps is to indicate sharing of data identified by a corresponding address within the plurality of cores.

Embodiments include any of the above first apparatus in which the small all-core sharing map-based coherence directory has no more than fifteen entries per core of the plurality of cores.

Embodiments include any of the above first apparatus in which the cluster sharing map-based coherence directory, and the small all-core sharing map-based coherence directory, are coupled to be accessed in parallel.

Embodiments include any of the above first apparatus in which the cluster sharing map-based coherence directory, and the small all-core sharing map-based coherence directory, are coupled to be accessed in series.

Embodiments include any of the above first apparatus in which the cores comprise at least thirty-two cores.

Embodiments include any of the above first apparatus in which the cores comprise at least one hundred cores.

In one embodiment, a first method includes storing corresponding pairs of addresses and cluster identifiers in a tag array of a cluster sharing map-based coherence directory. Each of the addresses is to identify data. Each of the cluster identifiers is to identify one of the clusters. The clusters logically group a plurality of cores. The first method also includes storing cluster sharing maps in a cluster sharing map array of the cluster sharing map-based coherence directory. Each of the cluster sharing maps corresponds to one of the pairs of addresses and cluster identifiers. Each of the cluster sharing maps is to indicate intra-cluster sharing of data identified by the corresponding address within a cluster identified by the corresponding cluster identifier. The first method also includes determining inter-cluster sharing of data corresponding to a given address by accessing from the cluster sharing map-based coherency directory a plurality of cluster sharing maps each corresponding to the given address and each having a different cluster identifier.

Embodiments include the above first method further comprising logically grouping the cores into the clusters, in which logically grouping comprises logically grouping at least one hundred cores into the plurality of clusters.

Embodiments include any of the above first methods further including indicating inter-cluster sharing of a given data identified by a given address between a first cluster and a second cluster by storing both a first cluster identifier to identify the first cluster, and a second cluster identifier to identify the second cluster, in different ways of a same set of the tag array. Also, storing both a first cluster sharing map to indicate intra-cluster sharing of the given data within the first cluster, and a second cluster sharing map to indicate intra-cluster sharing of the given data within the second cluster, in different corresponding ways of a same set of the cluster sharing map array.

Embodiments include any of the above first methods further including generating an all-core sharing map from a plurality of cluster sharing maps, each corresponding to a given address, and each corresponding to a different cluster identifier.

Embodiments include the above first method in which generating the all-core sharing map comprises rearranging the plurality of cluster sharing maps, from positions where they are stored in the cluster sharing map array, to positions in the all-core sharing map, based on the different corresponding cluster identifiers.

Embodiments include any of the above first methods further including comparing a plurality of addresses in a plurality of different ways of a set of the tag array with a reference address and indicating which of multiple addresses match the reference address.

Embodiments include any of the above first methods further comprising logically grouping the cores into the clusters, in which logically grouping the cores into the clusters comprises logically grouping the cores into clusters of non-overlapping sets of cores of equal size.

Embodiments include any of the above first methods further including accessing a small all-core sharing map-based coherence directory having no more than twenty entries per core. The small all-core sharing map-based coherence directory stores corresponding pairs of addresses and all-core sharing maps. Each of the all-core sharing maps is to indicate sharing of data identified by a corresponding address by any of the plurality of cores.

Embodiments include the above first method further including accessing the cluster sharing map-based coherence directory in parallel with accessing the small all-core sharing map-based coherence directory.

Embodiments include either of the two above first methods further including accessing the cluster sharing map-based coherence directory in series with accessing the small all-core sharing map-based coherence directory.

Embodiments include either of the three above first methods in which accessing comprises accessing a small all-core sharing map-based coherence directory that has no more than fifteen entries per core.

In one embodiment, a first system includes a multi-core apparatus. The multi-core apparatus includes a plurality of cores. The plurality of cores are logically grouped into a plurality of clusters. The multi-core apparatus also includes a memory controller coupled with a first core of the plurality. The multi-core apparatus also includes a cluster sharing map-based coherence directory coupled with the plurality of cores to track sharing of data among the plurality of cores. The cluster sharing map-based coherence directory includes a tag array to store corresponding pairs of addresses and cluster identifiers, each of the addresses to identify data, each of the cluster identifiers to identify one of the clusters. The cluster sharing map-based coherence directory also includes a cluster sharing map array to store cluster sharing maps, each of the cluster sharing maps corresponding to one of the pairs of addresses and cluster identifiers, each of the cluster sharing maps to indicate intra-cluster sharing of data identified by the corresponding address within a cluster identified by the corresponding cluster identifier. The first system also includes a memory coupled with the memory controller. The memory comprises a dynamic random access memory (DRAM).

Embodiments include the above first system further including logic to indicate inter-cluster sharing of a given data identified by a given address between a first cluster and a second cluster. The logic does this by storing both a first cluster identifier to identify the first cluster, and a second cluster identifier to identify the second cluster, in different ways of a same set of the tag array. The logic is also to store both a first cluster sharing map to indicate intra-cluster sharing of the given data within the first cluster, and a second cluster sharing map to indicate intra-cluster sharing of the given data within the second cluster, in different ways of a same set of the cluster sharing map array.

Embodiments include any of the above first systems further including logic to generate an all-core sharing map from a plurality of cluster sharing maps, each corresponding to a given address, and each corresponding to a different cluster identifier. The logic is to rearrange the plurality of cluster sharing maps, from positions where they are stored in the cluster sharing map array, to positions in the all-core sharing map, based on the different corresponding cluster identifiers.

In one embodiment, a second apparatus includes a plurality of cores. The plurality of cores are logically grouped into a plurality of clusters. A first means is coupled with the plurality of cores and is for tracking sharing of data among the plurality of cores. The first means includes a second means for storing corresponding pairs of addresses and cluster identifiers. Each of the addresses is to identify data. Each of the cluster identifiers is to identify one of the clusters. The first means also includes a second means for storing cluster sharing maps. Each of the cluster sharing maps corresponds to one of the pairs of addresses and cluster identifiers. Each of the cluster sharing maps is to indicate intra-cluster sharing of data identified by the corresponding address within a cluster identified by the corresponding cluster identifier.

In one embodiment, an apparatus is configured and/or operable to perform any of the methods disclosed herein.

What is claimed is:

1. An apparatus comprising:
   a plurality of cores, the plurality of cores logically grouped into a plurality of clusters; and
   a cluster sharing map-based coherence directory coupled with the plurality of cores configured to track sharing of data among the plurality of cores, the cluster sharing map-based coherence directory including:
   a tag array configured to store corresponding pairs of addresses and cluster identifiers in multiple sets and ways, each of the addresses configured to identify data, each of the cluster identifiers having a plurality of bits configured to identify only a single one of the clusters, wherein each address corresponds to only a single cluster identifier; and a cluster sharing map array configured to store cluster sharing maps, each of the cluster sharing maps corresponding to one of the pairs of addresses and cluster identifiers in a corresponding way of the tag array, each of the cluster sharing maps configured to indicate intra-cluster sharing of data identified by the corresponding address within a cluster identified by the plurality of bits of the corresponding cluster identifier.

2. The apparatus of claim 1, wherein the clusters logically group non-overlapping sets of cores of equal size.

3. The apparatus of claim 1, wherein a pair of an address and a cluster identifier are to be stored in a given set and a given way of the tag array, and wherein a cluster sharing map corresponding to the pair is to be stored in a corresponding set and a corresponding way of the cluster sharing map array.

4. The apparatus of claim 1, further comprising logic configured to indicate inter-cluster sharing of a given data identified by a given address between a first cluster and a second cluster by storing both a first cluster identifier configured to identify the first cluster and a second cluster identifier configured to identify the second cluster in different ways of a same set of the tag array, and by storing both a first cluster sharing map configured to indicate intra-cluster sharing of the given data within the first cluster and a second cluster sharing map configured to indicate intra-cluster sharing of the given data within the second cluster in different ways of a same set of the cluster sharing map array.

5. The apparatus of claim 1, further comprising logic configured to generate an all-core sharing map from a plurality of cluster sharing maps each corresponding to a given address and each corresponding to a different cluster identifier, by rearranging the plurality of cluster sharing maps, from positions where they are stored in the cluster sharing map array to positions in the all-core sharing map, based on the different corresponding cluster identifiers.

6. The apparatus of claim 1, further comprising tag comparison logic coupled with the tag array, the tag comparison logic configured to compare a plurality of addresses in different ways of a same set of the tag array and to provide a plurality of per-way match signals to indicate whether or not the addresses in the different ways match.

7. The apparatus of claim 1, further comprising a small all-core sharing map-based coherence directory having no more than twenty entries per core of the plurality of cores, the small all-core sharing map-based coherence directory configured to store corresponding pairs of addresses and all- core sharing maps, each of the all-core sharing maps configured to indicate sharing of data identified by a corresponding address within the plurality of cores.

8. The apparatus of claim 7, wherein the small all-core sharing map-based coherence directory has no more than fifteen entries per core of the plurality of cores.

9. The apparatus of claim 7, wherein the cluster sharing map-based coherence directory and the small all-core sharing map-based coherence directory are coupled to be accessed in parallel.

10. The apparatus of claim 7, wherein the cluster sharing map-based coherence directory and the small all-core sharing map-based coherence directory are coupled to be accessed in series.

11. The apparatus of claim 1, wherein the plurality of cores comprise at least thirty-two cores.

12. The apparatus of claim 11, wherein the plurality of cores comprise at least one hundred cores.

13. A method comprising:
storing corresponding pairs of addresses and cluster identifiers in multiple sets and ways of a tag array of a cluster sharing map-based coherence directory, each of the addresses to identify data, each of the cluster identifiers having a plurality of bits to identify only a single one of a plurality of clusters, wherein each address corresponds to only a single cluster identifier, the clusters logically grouping a plurality of cores;
storing cluster sharing maps in a cluster sharing map array of the cluster sharing map-based coherence directory, each of the cluster sharing maps corresponding to one of the pairs of addresses and cluster identifiers in a corresponding way of the tag array, each of the cluster sharing maps to indicate intra-cluster sharing of data identified by the corresponding address by cores within a cluster identified by the plurality of bits of the corresponding cluster identifier; and
determining inter-cluster sharing of data corresponding to a given address by accessing from the cluster sharing map-based coherency directory a plurality of cluster sharing maps each corresponding to the given address and each having a different cluster identifier.

14. The method of claim 13, further comprising logically grouping the cores into the clusters, wherein logically grouping comprises logically grouping at least one hundred cores into the plurality of clusters.

15. The method of claim 13, further comprising indicating inter-cluster sharing of a given data identified by a given address between a first cluster and a second cluster by:
storing both a first cluster identifier to identify the first cluster and a second cluster identifier to identify the second cluster in different ways of a same set of the tag array; and
storing both a first cluster sharing map to indicate intra-cluster sharing of the given data within the first cluster and a second cluster sharing map to indicate intra-cluster sharing of the given data within the second cluster in different corresponding ways of a same set of the cluster sharing map array.

16. The method of claim 13, further comprising generating an all-core sharing map from a plurality of cluster sharing maps each corresponding to a given address and each corresponding to a different cluster identifier.

17. The method of claim 16, wherein generating the all-core sharing map comprises rearranging the plurality of cluster sharing maps, from positions where they are stored in the cluster sharing map array, to positions in the all-core sharing map, based on the different corresponding cluster identifiers.

18. The method of claim 13, further comprising comparing a plurality of addresses in a plurality of different ways of a set of the tag array with a reference address and indicating which of multiple addresses match the reference address.

19. The method of claim 13, further comprising logically grouping the cores into the clusters, wherein logically grouping the cores into the clusters comprises logically grouping the cores into clusters of non-overlapping sets of cores of equal size.

20. The method of claim 13, further comprising accessing a small all-core sharing map-based coherence directory having no more than twenty entries per core, the small all-core sharing map-based coherence directory storing corresponding pairs of addresses and all-core sharing maps, each of the all-core sharing maps to indicate sharing of data identified by a corresponding address by any of the plurality of cores.

21. The method of claim 20, further comprising accessing the cluster sharing map-based coherence directory in parallel with accessing the small all-core sharing map-based coherence directory.

22. The method of claim 20, further comprising accessing the cluster sharing map-based coherence directory in series with accessing the small all-core sharing map-based coherence directory.

23. The method of claim 22, wherein the cluster sharing map-based coherence directory accesses the small all-core sharing map-based coherence directory.

24. The method of claim 20, wherein accessing comprises accessing a small all-core sharing map-based coherence directory that has no more than fifteen entries per core.

25. A system comprising:
a multi-core apparatus, the multi-core apparatus including:
a plurality of cores, the plurality of cores logically grouped into a plurality of clusters;
a memory controller coupled with a first core of the plurality; and
a cluster sharing map-based coherence directory coupled with the plurality of cores configured to track sharing of data among the plurality of cores, the cluster sharing map-based coherence directory including:
a tag array configured to store corresponding pairs of addresses and cluster identifiers, each of the addresses to identify data, each of the cluster identifiers having a plurality of bits configured to identify only a single one of the clusters, wherein each address corresponds to only a single cluster identifier; and a cluster sharing map array configured to store cluster sharing maps, each of the cluster sharing maps corresponding to one of the pairs of addresses and cluster identifiers in a way of the tag array that is configured to store the corresponding cluster identifier, each of the cluster sharing maps configured to indicate intra-cluster sharing of data identified by the corresponding address within a cluster identified by the plurality of bits of the corresponding cluster identifier; and a memory coupled with the memory controller, wherein the memory comprises a dynamic random access memory (DRAM).

26. The system of claim 25, further comprising logic configured to indicate inter-cluster sharing of a given data identified by a given address between a first cluster and a second cluster by storing both a first cluster identifier configured to identify the first cluster and a second cluster identifier configured to identify the second cluster in different ways of a same set of the tag array, and by storing both a first cluster sharing map configured to indicate intra-cluster sharing of the given data within the first cluster and a second cluster sharing map configured to indicate intra-cluster sharing of the given data within the second cluster in different ways of a same set of the cluster sharing map array.

27. The system of claim 25, further comprising logic configured to generate an all-core sharing map from a plurality of cluster sharing maps each corresponding to a given address and each corresponding to a different cluster identifier, by rearranging the plurality of cluster sharing maps, from positions where they are stored in the cluster sharing map array to positions in the all-core sharing map, based on the different corresponding cluster identifiers.

* * * * *